(12) United States Patent
Ueno

(10) Patent No.: US 7,147,704 B2
(45) Date of Patent: Dec. 12, 2006

(54) PIGMENT DISPERSING AGENT, PIGMENT COMPOSITION AND PIGMENT DISPERSION

(75) Inventor: Yoshimitsu Ueno, Tokyo (JP)

(73) Assignee: Tokyo Ink Mfg. Co., Ltd, Tokyo (JP)

( * ) Notice: Subject to any disclaimer, the term of this patent is extended or adjusted under 35 U.S.C. 154(b) by 0 days.

(21) Appl. No.: 11/378,299

(22) Filed: Mar. 20, 2006

(65) Prior Publication Data

US 2006/0207478 A1    Sep. 21, 2006

(30) Foreign Application Priority Data

Mar. 18, 2005    (JP) ............... 2005-078430

(51) Int. Cl.
*C09B 25/00* (2006.01)
*C09B 67/20* (2006.01)

(52) U.S. Cl. ............ 106/498; 106/413; 106/493; 106/494; 106/495; 106/496; 106/497

(58) Field of Classification Search ........... 106/413, 106/493, 494, 495, 496, 497, 498
See application file for complete search history.

(56) References Cited

U.S. PATENT DOCUMENTS 4,088,651 A * 5/1978 Kalz et al. ............ 546/154
4,588,811 A * 5/1986 Adam ..................... 544/128
4,656,268 A * 4/1987 Adam ..................... 544/126
5,342,950 A * 8/1994 Kilpper et al. ........... 546/171
6,235,099 B1 * 5/2001 Aida et al. ............. 106/31.65
2004/0266911 A1* 12/2004 Aida et al. ............... 523/160

FOREIGN PATENT DOCUMENTS

| JP | 53-5227 A | * | 1/1978 |
| JP | 2001-335711 A | * | 12/2001 |
| JP | 2002-121418 A | * | 4/2002 |
| JP | 2002-121457 A | * | 4/2002 |
| JP | 2002-179979 A | * | 6/2002 |
| JP | 2003-167112 A | * | 6/2003 |
| JP | 2006-16479 A | * | 1/2006 |

\* cited by examiner

*Primary Examiner*—Anthony J. Green
(74) *Attorney, Agent, or Firm*—Wenderoth, Lind & Ponack, L.L.P.

(57) ABSTRACT

A pigment dispersing agent wherein a quinophthalone structure is bonded to a triazine structure through an arylene group or a heteroaromatic ring and a basic functional group is bonded to triazine ring through a connecting group which pigment dispersing agent improves an ink or a coating in fluidity and is effective for preparing a product having a low viscosity and low thixotropic properties and having excellent properties such as tinting strength, transparency and viscosity stability with the passage of time, and a pigment composition and a pigment dispersion containing the same.

11 Claims, No Drawings

PIGMENT DISPERSING AGENT, PIGMENT COMPOSITION AND PIGMENT DISPERSION

FIELD OF THE INVENTION

The present invention relates to a pigment dispersing agent used for dispersing pigment particles, and a pigment composition and a pigment dispersion containing the same.

BACKGROUND OF THE INVENTION

Generally, many of pigments having high tinting strength and a clear color tone have fine primary particles. However, these pigments are generally aggregates of primary particles. It is required to disperse them so as to convert their aggregate state into a finer state for bringing out the properties of the pigments themselves. However, as pigment particles become finer, generally, it becomes difficult to disperse the pigment particles homogeneously.

Dispersions in poor dispersing state have a high viscosity in many cases and it is difficult to handle them, e.g. disperse or transport them. In some cases, the dispersions undergo gelation and thus become impossible to use. Further, when such a dispersion is mixed with a different kind of pigment, a phenomenon such as segregation or settling due to the aggregation of pigments causes uneven coloring of a coated matter or a considerable decrease in tinting strength in some cases. In addition, poor dispersing causes a failure such as a decrease in the gloss of a coating film or poor leveling in some cases.

Further, some of organic pigments cause a change of a pigment crystal state in a dispersion medium in some cases. That is, it is a phenomenon where pigment particles, which are energetically unstable, change in their size or shape in a non-aqueous vehicle and their crystal state converts to a more stable state. In such a case, a failure such as a considerable decrease in tinting strength, a change in hue or the generation of coarse particles occurs generally so that the commercial value decreases considerably.

It is known that it is effective to use a variety of derivatives having a pigment structure or a structure close to it for overcoming the above problems. A variety of structures, such as a pigment derivative obtained by introducing an acidic group, a basic group or a functional group such as a phthalimide methyl group into a pigment structure or a pigment derivative obtained by bonding a pigment structure to part of a resin, have been conventionally disclosed. These structures have been long used for uses such as a dispersing agent, a particle growth inhibitor or a crystal transition inhibitor.

JP-A-2003-167112, JP-A-2002-179979, JP-2002-121418, JP-A-2002-121457 and JP-A-2001-335711 disclose compounds having a quinophthalone structure as a pigment dispersing agent. These compounds are used for a colored curable composition such as a resist ink for a color filter. Each of these compounds has the effect of improving a dispersing state but does not have sufficient properties for preparing a pigment dispersion in which pigment particles are finely dispersed and which is excellent in fluidity and storage stability with the passage of time.

SUMMARY OF THE INVENTION

It is an object of the present invention to provide a pigment dispersing agent which is effective for dispersing a pigment in a variety of uses such as an ink or a coating and a pigment composition containing the same.

It is another object of the present invention to provide a pigment dispersion which is excellent in properties such as tinting strength and transparency and has a low viscosity and excellent storage stability.

The present inventors have made diligent studies and as a result found that a pigment dispersing agent having the following structure can overcome the above objects. On the basis of the above finding, the present inventors have arrived at the present invention.

That is, the present invention provides the following pigment dispersing agents, pigment compositions and pigment dispersion.

(1) A pigment dispersing agent represented by the formula (1),

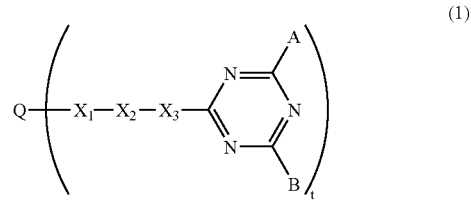

wherein

Q represents a quinophthalone residue or a substituted quinophthalone residue, $X_1$ represents a group selected from the group consisting of —NR'SO$_2$—, —SO$_2$NR'—, —CONR'—, —CH$_2$NR'COCH$_2$NR'— and —NR'CO—, $X_2$ represents at least one group selected from the group consisting of an arylene group having 20 or less carbon atoms, a substituted arylene group having 20 or less carbon atoms, a heteroaromatic ring having 20 or less carbon atoms, and a substituted heteroaromatic ring having 20 or less carbon atoms, or at least two groups which are selected from the group consisting of an arylene group having 20 or less carbon atoms, a substituted arylene group having 20 or less carbon atoms, a heteroaromatic ring having 20 or less carbon atoms, and a substituted heteroaromatic ring having 20 or less carbon atoms, and are bonded to each other with a divalent connecting group selected from the group consisting of —NR'—, —O—, —SO$_2$— and —CO—, $X_3$ represents —NR'— or —O—, where R' represents a hydrogen atom, an alkyl group having 20 or less carbon atoms, a substituted alkyl group having 20 or less carbon atoms, an alkenyl group having 20 or less carbon atoms, a substituted alkenyl group having 20 or less carbon atoms, an aryl group having 20 or less carbon atoms or a substituted aryl group having 20 or less carbon atoms, each of A and B independently represents a group selected from a group represented by the formula (2) or the formula (3), —O—(CH$_2$)$_n$—R$_8$, —OR$_9$, —NR$_{10}$R$_{11}$, —Cl, —F or —X$_3$—X$_2$—X$_1$-Q, where R$_8$ represents a nitrogen-containing heterocyclic residue or a substituted nitrogen-containing heterocyclic residue, each of R$_9$, R$_{10}$ and R$_{11}$ independently represents a hydrogen atom, an alkyl group having 20 or less carbon atoms, a substituted alkyl group having 20 or less carbon atoms, an alkenyl group having 20 or less carbon atoms, a substituted alkenyl group having 20 or less carbon atoms, an aryl group having 20 or less carbon atoms or a substituted aryl group having 20 or less carbon atoms, and n is an integer of 0 to 20, provided that at least one of A and B is a group represented by the formula (2) or the formula (3), —O—(CH$_2$)$_n$—R$_8$, —OR$_9$ or —NR$_{10}$R$_{11}$, and t is an integer of 1 to 3,

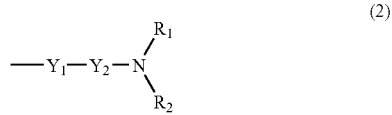

(2)

wherein

Y$_1$ represents —NR'— or —O—,

Y$_2$ represents at least one group selected from the group consisting of an alkylene group having 20 or less carbon atoms, a substituted alkylene group having 20 or less carbon atoms, an alkenylene group having 20 or less carbon atoms, a substituted alkenylene group having 20 or less carbon atoms, an arylene group having 20 or less carbon atoms and a substituted arylene group having 20 or less carbon atoms, or at least two groups which are selected from these alkylene groups, alkenylene groups and arylene groups and are bonded to each other with a divalent connecting group selected from the group consisting of —NR'—, —O—, —SO$_2$— and —CO—, where R' is as defined in the formula (1), and each of R$_1$ and R$_2$ independently represents an alkyl group having 20 or less carbon atoms, a substituted alkyl group having 20 or less carbon atoms, an alkenyl group having 20 or less carbon atoms or a substituted alkenyl group having 20 or less carbon atoms, or R$_1$ and R$_2$ together form a heterocyclic structure containing a further nitrogen atom, an oxygen atom or a sulfur atom or a substituted heterocyclic structure containing a further nitrogen atom, an oxygen atom or a sulfur atom,

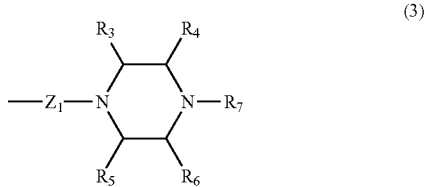

(3)

wherein

Z$_1$ is a single bond or represents —NR'—, —NR'-CO—, —NR'-G-CONR"—, —NR'-G-SO$_2$—, —NR'-G-SO$_2$NR"—, —O-G-CO—, —O-G-CONR'—, —O-G-SO$_2$— or —O-G-SO$_2$NR'—, where G represents an alkylene group having 20 or less carbon atoms, a substituted alkylene group having 20 or less carbon atoms, an alkenylene group having 20 or less carbon atoms, a substituted alkenylene group having 20 or less carbon atoms, an arylene group having 20 or less carbon atoms or a substituted arylene group having 20 or less carbon atoms, and each of R' and R" independently represents a hydrogen atom, an alkyl group having 20 or less carbon atoms, a substituted alkyl group having 20 or less carbon atoms, an alkenyl group having 20 or less carbon atoms, a substituted alkenyl group having 20 or less carbon atoms, an aryl group having 20 or less carbon atoms or a substituted aryl group having 20 or less carbon atoms, each of R$_3$, R$_4$, R$_5$ and R$_6$ independently represents a hydrogen atom, an alkyl group having 20 or less carbon atoms, a substituted alkyl group having 20 or less carbon atoms, an alkenyl group having 20 or less carbon atoms, a substituted alkenyl group having 20 or less carbon atoms, an aryl group having 20 or less carbon atoms or a substituted aryl group having 20 or less carbon atoms, and R$_7$ represents an alkyl group having 20 or less carbon atoms, a substituted alkyl group having 20 or less carbon atoms, an alkenyl group having 20 or less carbon atoms or a substituted alkenyl group having 20 or less carbon atoms.

(2) A pigment composition containing a pigment and the pigment dispersing agent recited in the above (1).

(3) A pigment composition according to the above (2), wherein the pigment contains a yellow pigment.

(4) A pigment composition according to the above (3), wherein the yellow pigment contains at least one pigment selected from the group consisting of C.I. Pigment Yellow 138, C.I. Pigment Yellow 139, C.I. Pigment Yellow 150, C.I. Pigment Yellow 185 and C.I. Pigment Yellow 13.

(5) A pigment composition according to the above (2), wherein the pigment contains a green pigment.

(6) A pigment composition according to the above (3), wherein the pigment further contains a green pigment.

(7) A pigment composition according to the above (5), wherein the green pigment contains C.I. Pigment Green 7 or C.I. Pigment Green 36.

(8) A pigment composition according to the above (2), wherein the pigment contains a red pigment or an orange pigment.

(9) A pigment composition according to the above (3), wherein the pigment further contains a red pigment or an orange pigment.

(10) A pigment composition according to the above (8), wherein the red pigment or the orange pigment contains at least one pigment selected from the group consisting of C.I. Pigment Red 254, C.I. Pigment Red 255, C.I. Pigment Red 264, C.I. Pigment Red 177, C.I. Pigment Red 207, C.I. Pigment Red 48:1, C.I. Pigment Orange 71 and C.I. Pigment Orange 73.

(11) A pigment dispersion obtained by dispersing the pigment composition recited in the above (2) in a non-aqueous medium.

EFFECT OF THE INVENTION

The pigment dispersing agent of the present invention has a high effect of finely dispersing a variety of pigments so as to have a low viscosity as compared with conventional pigment dispersing agents. It is possible to prepare a dispersion having high transparency, high tinting strength and excellent storage stability by using the above pigment dispersing agent. Further, a product, such as a coating or an ink, of high quality can be easily produced by using the pigment composition or pigment dispersion containing the pigment dispersing agent of the present invention.

A product, such as an ink or a coating, which is excellent in non-agglomeration properties, non-crystallizing properties, the gloss of a coating film and transparency and also has a low viscosity, low thixotropic properties and excellent viscosity stability with the passage of time can be obtained by using the pigment dispersing agent, pigment composition or pigment dispersion of the present invention. It is suited for uses such as a gravure ink, a variety of general coatings for cars, for wood and for metals, a backcoat coating of a magnetic tape, a radiation-cure type ink, an ink for an inkjet printer or an ink for a color filter.

DETAILED DESCRIPTION OF THE INVENTION

The pigment dispersing agent of the present invention is a compound where a quinophthalone structure and a triazine structure are bonded through an arylene group or a heteroaromatic ring and a basic functional group is further bonded to triazine through a connecting group. When a pigment is dispersed in a non-aqueous medium by using the above pigment dispersing agent, there can be prepared a pigment dispersion excellent in various properties. JP-A-2002-121457 and JP-A-2001-335711 disclose compounds having similar structures as a pigment dispersing agent. However, it is difficult to synthesize the pigment dispersing agent of the present invention by these conventional technologies.

Q in the formula (1) represents a substituted or non-substituted quinophthalone residue represented by the formula (4).

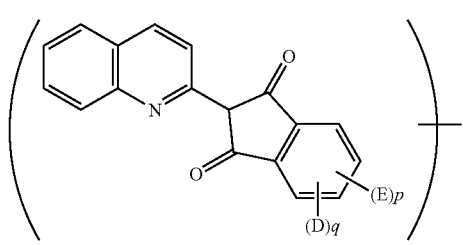

(4)

In the formula (4), each of D and E independently represents a group selected from the group consisting of a hydrogen atom, a halogen atom, an alkyl group having 1 to 20 carbon atoms, a substituted or non-substituted aromatic ring or a substituted or non-substituted heterocyclic ring each of which is formed together with the benzene ring to which D and E are bonded, a hydroxyl group, an alkoxyl group having 1 to 3 carbon atoms, a carboxyl group or its salt, an ester having 1 to 20 carbon atoms, an amide having 1 to 20 carbon atoms, a sulfonic acid group or its salt, a sulfamoyl group, a nitro group, and —NR'R"— wherein each of R' and R" independently represents a hydrogen atom, an alkyl group having 20 or less carbon atoms, a substituted alkyl group having 20 or less carbon atoms, an alkenyl group having 20 or less carbon atoms, a substituted alkenyl group having 20 or less carbon atoms, an aryl group having 20 or less carbon atoms or a substituted aryl group having 20 or less carbon atoms; p is an integer of 4 or less; and q is an integer calculated by 4−p. In particular, a case wherein E is a hydrogen atom or a halogen atom such as a chlorine atom or a bromine atom and p is 4 is preferred.

A quinophthalone compound which is used for forming the quinophthalone residue of the formula (4) can be synthesized by dehydrating-condensation of a quinaldine with a phthalic anhydride represented by the formula (5) or a phthalic acid represented by the formula (6) in a benzoic acid or a high boiling point solvent.

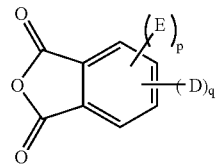

(5)

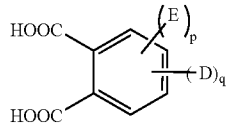

(6)

wherein D, E, p and q are as defined in the formula (4).

For example, the benzoic acid and the phthalic anhydride of the formula (5) are heated and molten at a temperature of at least 130° C. and then the quinaldine is added. In this reaction, the quinaldine and the phthalic anhydride are generally used in a molar ratio of from 1:1 to 1:5. Further, the quinaldine and the benzoic acid are generally used in a molar ratio of from 1:2 to 1:20. The molar ratio between the quinaldine and the benzoic acid can be increased or decreased according to the stirring state of the reaction mixture. After the raw materials are molten, the mixture is heated to 150 to 180° C. and stirred for 3 to 8 hours. In this case, it is possible to determine the termination point of the reaction by carrying out component analysis of the reaction mixture according to a high performance liquid chromatograph or other methods. After the termination of the reaction, the reaction mixture is cooled to 130 to 150° C. The cooled mixture is diluted with water as required. Then, an alkali aqueous solution such as an aqueous solution of 5 to 20% by weight of sodium hydroxide or potassium hydroxide is added. The benzoic acid is converted into a water-soluble alkali metal salt by the above operation, and the water-soluble alkali metal salt can be separated from a generated quinophthalone compound by means of filtration. Then, washing is carried out with water, followed by drying, whereby the quinophthalone compound which is used for forming the quinophthalone residue of the formula (4) can be obtained.

Further, as a post treatment other than the above method using the alkali aqueous solution, a purification method using a solvent is effective. It is a method in which the reaction mixture is diluted with a solvent such as methanol, ethanol, propanol, isopropanol, ethylene glycol, ethylene glycol monobutyl ether, toluene or xylene or a mixture of at least two members of these solvents. The benzoic acid is soluble in these solvents. Therefore, when a product is insoluble, the product can be separated by means of filtration.

In another way, the above dehydrating condensation may be carried out after the synthesis of a compound represented by the formula (7) according to the following method. The reaction conditions and post-treatment method in this case are the same as those in the above-explained case where the quinaldine is reacted with the phthalic anhydride represented by the formula (5) or the phthalic acid represented by the formula (6).

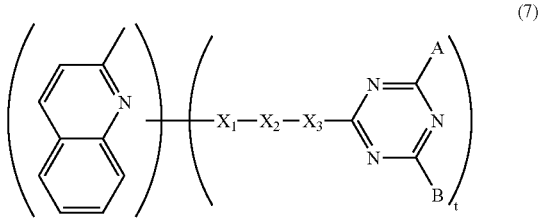

(7)

wherein $X_1$, $X_2$, $X_3$, A, B and t are as defined in the formula (1).

The compound of the formula (1) or the compound of the formula (7) can be synthesized by synthesizing an intermediate having a structure represented by the formula (8) or the formula (9) and then reacting the intermediate with cyanuric chloride and introduction sources of A and B.

$$Q \!-\!\!\left(X_1\!-\!X_2\!-\!X_3'\right)_t \quad (8)$$

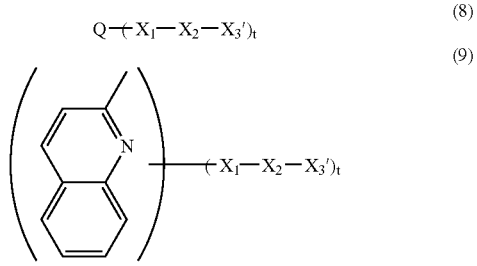

(9)

wherein $X_3'$ represents a primary or secondary amino group or a hydroxyl group and Q, $X_1$, $X_2$ and t are as defined in the formula (1).

The method of synthesizing the intermediate of the formula (8) or the formula (9) is not specially limited so long as it is a method which can synthesize the intermediate of the formula (8) or the formula (9) finally. Some methods will be explained as examples.

The first example is a method in which a quinophthalone compound or a quinaldine is chlorosulfonated to obtain a chlorosulfonated quinophthalone compound or quinaldine, and then a primary diamine, a secondary diamine or a hydroxylamine is reacted with the chlorosulfonated quinophthalone compound or quinaldine.

The chlorosulfonation can be carried out according to a known method. For example, the quinophthalone compound or quinaldine is dissolved in a chlorosulfonic acid and the mixture is stirred under heat at 40 to 140° C. for 1 to 8 hours. The mixture is cooled to 40 to 50° C. Then thionyl chloride is added and the mixture is further stirred for 1 to 8 hours. In this case, it is possible to determine the termination point of the reaction by following the reaction by means of an absorption spectrum measurement of a sulfuric acid solution, or the like. After the termination of the reaction, the reaction mixture is poured to a large quantity of ice water, followed by filtration and washing with ice water, to obtain a chlorosulfonated product of the quinophthalone compound or quinaldine.

The thus-obtained chlorosulfonated product of the quinophthalone compound or quinaldine is slurried in water. Then, a diamine or a hydroxylamine is added and the mixture is stirred at 5 to 80° C. for 1 to 5 hours. In this case, it is possible to determine the termination point of the reaction by carrying out component analysis of the reaction mixture according to a high performance liquid chromatograph or other methods. After the termination of the reaction, the reaction mixture is filtered, washed with water and dried, whereby the intermediate represented by the formula (8) or the formula (9) can be obtained. In this reaction, when the solubility of the diamine or the hydroxylamine in water is low, a solvent which does not inhibit the reaction such as acetone may be used. Further, hydrogen chloride generates in accordance with the progress of the reaction so that an inorganic base or a tertiary amine may be added as required.

The diamine used in the above reaction is not specially limited so long as it is a compound which can form a structure of $—X_1—X_2—X_3'$. Examples of the diamine include 1,2-phenylenediamine, 1,3-phenylenediamine, 1,4-phenylenediamine, 2,5-diaminobenzenesulfonic acid, 1,5-diaminonaphthalene, 1,8-diaminonaphthalene, 2,4-diaminopyrimidine, 4,5-diaminopyrimidine, 2,3-diaminopyridine, 2,5-diaminopyridine, 2,6-diaminopyridine, 3,4-diaminopyridine, 2,6-diaminopurine, 3,5-diamino-1,2,4-triazole and acetoguanamine. The amount of the diamine to be used is not specially limited so long as it is at least equimolar to the amount of the chlorosulfonated product of the quinophthalone compound or quinaldine. It is preferred to use the diamine in an amount of approximately 1 to 5 mol per mol of the chlorosulfonated product of the quinophthalone compound or quinaldine.

In the above first example, the intermediate of the formula (8) or the formula (9) can be synthesized by using p-aminoacetanilide or the like in place of the diamine or the hydroxylamine. In this case, the chlorosulfonated product of the quinophthalone compound or quinaldine is reacted with p-aminoacetanilide or the like in the same manner as in the above-explained case where the diamine is used, and then an acetamido group is hydrolyzed, whereby the intermediate having a structure represented by the formula (8) or the formula (9) can be obtained.

The second example is a method in which a connecting group is introduced into a quinophthalone compound or quinaldine by chloroacetamidomethyl modification or other methods and then a diamine or a hydroxylamine is reacted.

The chloroacetamidomethyl modification reaction can be carried out according to a known method. For example, the quinophthalone compound or quinaldine is dissolved in sulfuric acid and then α-chloroacetamide and paraformaldehyde are added. The mixture is stirred at 20 to 120° C. for 2 to 10 hours to carry out chloroacetamidomethyl modification. In this case, it is possible to determine the termination point of the reaction on the basis of the consumption of the quinophthalone compound or quinaldine by following the reaction according to a high performance liquid chromatograph or other methods. After the termination of the reaction, the reaction mixture is cooled and then poured to a large quantity of ice water, followed by filtration and washing with ice water, to obtain a chloroacetamidomethyl-modified product of the quinophthalone compound or quinaldine.

The thus-obtained chloroacetamidomethyl-modified product of the quinophthalone compound or quinaldine is slurried in water. The diamine or the hydroxyl amine is added and then the mixture is stirred at 5 to 80° C. for 1 to 5 hours. In this case, it is possible to determine the termination point of the reaction by carrying out component analysis of the reaction mixture according to a high performance liquid chromatograph or other methods. After the termination of the reaction, the reaction mixture is filtered, washed with water and dried, whereby the intermediate represented by the formula (8) or the formula (9) can be obtained. The diamine or the hydroxylamine used in the above reaction is not specially limited so long as it is a compound which can form a structure of —$X_1$—$X_2$—$X_3$'. Examples of the diamine include the compounds recited in the above first example. The amount of the diamine or the hydroxylamine to be used is not specially limited so long as it is at least equimolar to the amount of the chloroacetamidomethyl-modified product of the quinophthalone compound or quinaldine. It is preferred to use the diamine or the hydroxylamine in an amount of about 1 to 5 mol per mol of the chloroacetamidomethyl-modified product of the quinophthalone compound or quinaldine. In this reaction, when the solubility of the diamine or the hydroxylamine in water is low, a solvent which does not inhibit the reaction such as acetone may be used. Hydrogen chloride generates in accordance with the progress of the reaction so that an inorganic base or a tertiary amine may be added as required. Further, the intermediate of the formula (8) or the formula (9) can be synthesized by using p-aminoacetanilide or the like in place of the diamine or the hydroxylamine like the first example.

The third example is a method in which a compound represented by the formula (10) is synthesized from a trimellitic anhydride and a quinaldine, then a carboxyl group is chlorinated to obtain an acid chloride, and the acid chloride is reacted with a diamine or a hydroxylamine. The compound of the formula (10) can be synthesized by the same method as the synthesis method of the quinophthalone compound which is used for forming the quinophthalone residue of the formula (4).

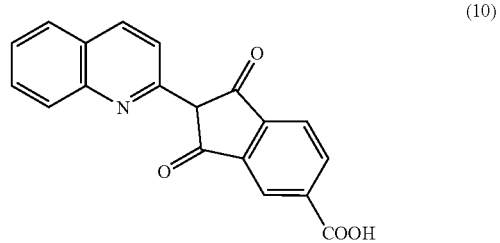

(10)

The chlorination of the carboxyl group can be carried out according to a known method. For example, the compound of the formula (10) is added to a chlorosulfonic acid, and the mixture is stirred at 10 to 30° C. for 1 to 3 hours. Then thionyl chloride is added, and the mixture is stirred at 40 to 50° C. for 2 to 5 hours. The reaction mixture is poured to a large quantity of ice water, followed by filtration and washing with ice water, to obtain an aqueous cake of carboxylic acid chloride.

The thus-obtained carboxylic acid chloride is slurried in water and the diamine or the hydroxylamine is added. Then, the mixture is stirred at 10 to 80° C. for 1 to 5 hours. In this case, it is possible to determine the termination point of the reaction by carrying out component analysis of the reaction mixture according to a high performance liquid chromatograph or other methods. After the termination of the reaction, the reaction mixture is filtered, washed with water and dried, whereby the intermediate represented by the formula (8) can be obtained. The diamine or the hydroxylamine used in the above reaction is not specially limited so long as it is a compound which can form a structure of —$X_1$—$X_2$—$X_3$'. Examples of the diamine include the compounds recited in the above first example. The amount of the diamine or the hydroxylamine to be used is not specially limited so long as it is at least equimolar to the amount of the carboxylic acid chloride. It is preferred to use the diamine or the hydroxylamine in an amount of approximately 1 to 5 mol per mol of the carboxylic acid chloride. In this reaction, when the solubility of the diamine or the hydroxylamine in water is low, a solvent which does not inhibit the reaction such as acetone may be used. Hydrogen chloride generates in accordance with the progress of the reaction so that an inorganic base or a tertiary amine may be added as required. Further, the intermediate of the formula (8) can be synthesized by using p-aminoacetanilide or the like in place of the diamine or the hydroxylamine like the first example.

The fourth example is a method in which an aminoquinaldine and an acid chloride having an acetamido group are reacted and then acetamido is hydrolyzed to convert it into an amino group.

The reaction of the aminoquinaldine and the acid chloride having an acetamido group can be carried out by a known method. For example, the aminoquinaldine and 4-acetamidobenzenesulfonyl chloride are stirred in a solvent at 10 to 50° C. for 1 to 5 hours in the presence of an inorganic base or a tertiary amine. The solvent used in the above reaction is not specially limited so long as it does not inhibit the reaction. The kind of the inorganic base or tertiary amine used in the reaction is not specially limited, and the amount thereof is not specially limited so long as it is an amount enough to neutralize hydrogen chloride generated in the reaction. It is possible to determine the termination point of the reaction by carrying out component analysis of the reaction mixture according to a high performance liquid chromatograph or other methods. A compound represented by the formula (11), generated in the above reaction, may be purified by filtration, washing with water and drying, while it is possible to directly use the compound of the formula (11) in a subsequent reaction without carrying out these operations.

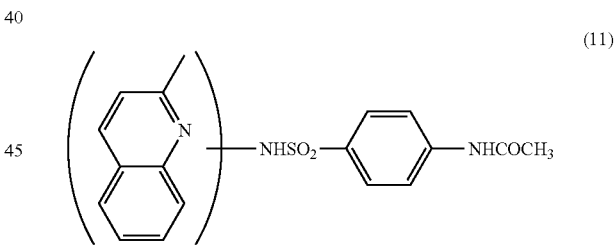

(11)

Water is added to a solution containing the compound of the formula (11) produced above, then hydrochloric acid is added until the pH becomes 1 or less, and the mixture is heated to a reflux temperature. When a low boiling point solvent other than water is used for the synthesis of the compound of the formula (11), the solvent is distilled off until the reflux temperature reaches 100° C. An acetamide group is converted into an amino group by stirring the reaction liquid at 100° C. for 1 to 5 hours. In this case, it is possible to determine the termination point of the reaction by carrying out component analysis of the reaction mixture according to a high performance liquid chromatograph or other methods. After the termination of the reaction, the reaction liquid is cooled to room temperature and then neutralized, and a product obtained is filtered and washed with water, whereby the intermediate of the formula (9) can be obtained.

The fifth example is a method in which an aminoquinaldine and an acid chloride having a nitro group are reacted and then the nitro group is reduced to convert it into an amino group.

The reaction of the aminoquinaldine and the acid chloride having a nitro group can be carried out by a known method. For example, the aminoquinaldine and 4-nitrobenzoyl chloride are reacted in the same manner as in the above synthesis of the compound of the formula (11) to obtain a product, and the product is filtered and washed, to obtain a compound represented by the formula (12).

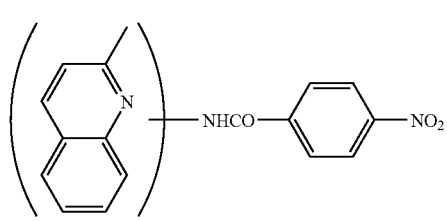

(12)

The thus-obtained compound of the formula (12) is slurried in water, and sodium sulfide 9-hydrate is added. The amount of sodium sulfide 9-hydrate is not specially limited so long as it is at least an amount enough to reduce the nitro group. Generally, sodium sulfide 9-hydrate is used in an amount of about 1.5 to 10 mol per mol of the compound of the formula (12). The slurry is stirred at 50 to 80° C. to convert the nitro group into an amino group. In this case, it is possible to determine the termination point of the reaction by carrying out component analysis of the reaction mixture according to a high performance liquid chromatograph or other methods. After the termination of the reaction, impurities derived of sodium sulfide are removed by sufficient washing, whereby the intermediate of the formula (9) can be obtained.

Further, the reduction of the nitro group may be carried out after a quinophthalone compound represented by the formula (13) is synthesized from the compound of the formula (12) and a phthalic anhydride. In this case, the compound of the formula (13) can be synthesized by the same method as the synthesis method of the quinophthalone compound which is used for forming the quinophthalone residue of the formula (4).

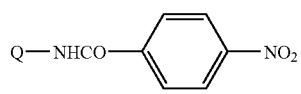

(13)

wherein Q is as defined in the formula (1).

The intermediate of the formula (8) can be obtained by reducing a nitro group of the thus-synthesized compound of the formula (13). The synthesis conditions in this case are the same as those in the synthesis of the compound of the formula (9) from the compound of the formula (12).

The reaction of producing the compound of the formula (1) or the compound of the formula (7) by using the intermediate of the formula (8) or the formula (9) produced by any one of the above methods can be carried out according to a known method.

For example, the intermediate of the formula (8) or the formula (9) and cyanuric chloride are stirred in a solvent at 5 to 15° C. for 1 to 5 hours in the presence of an inorganic base or a tertiary amine, to synthesize a compound represented by the formula (14) or a compound represented by the formula (15). The solvent used in the synthesis is not specially limited so long as it does not inhibit the reaction. The solvent is particularly preferably a lower ketone such as acetone. Further the amount of the cyanuric chloride is not specially limited so long as it is at least equimolar to the amount of the intermediate of the formula (8) or the formula (9). The kind of the inorganic salt or tertiary amine is not specially limited. The amount of the inorganic salt or tertiary amine is not specially limited so long as it is an amount enough to neutralize hydrogen chloride generated in the reaction. It is possible to determine the termination point of the reaction by carrying out component analysis of the reaction mixture according to a high performance liquid chromatograph or other methods. After the termination of the reaction, a product is filtered and washed, to obtain the compound of the formula (14) or the formula (15).

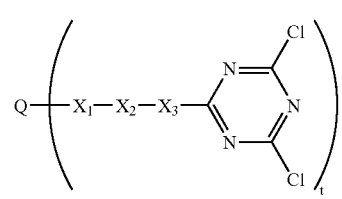

(14)

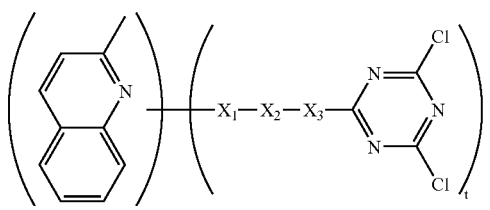

(15)

wherein Q, $X_1$, $X_2$ and $X_3$ are as defined in the formula (1).

The thus-obtained compound of the formula (14) or the formula (15), an amine component and an alcohol component are stirred in a solvent at a temperature of 40 to 100° C. for 1 to 8 hours, to synthesize the compound of the formula (1) or the formula (7). The solvent used in the above synthesis is not specially limited so long as it does not inhibit the reaction. A solvent having high solubility such as 1,4-dioxane is particularly preferred. Hydrogen chloride generates in accordance with the progress of the reaction so that an inorganic base or a tertiary amine may be added as required. In this case, the kind of the inorganic salt or tertiary amine is not specially limited. The amount of the inorganic salt or tertiary amine is not specially limited so long as it is an amount enough to neutralize hydrogen chloride generated in the reaction. It is possible to determine the termination point of the reaction by carrying out component analysis of the reaction mixture according to a high performance liquid chromatograph or other methods. When a solvent other than water is used in the above reaction, a product is made insoluble by pouring the reaction mixture into a large quantity of water or adding water to the reaction mixture and then distilling off the solvent. After the termination of the reaction, a product is separated by filtration, decantation or the like and then washed, whereby the compound of the formula (1) or the formula (7) can be obtained.

The amine component or the alcohol component used in the above reaction is not specially limited so long as it forms a structure represented by the formula (2) or the formula (3) after the termination of the reaction. Examples of the amine component or the alcohol component used for forming the structure of the formula (2) include amines and alcohols such as N,N-dimethylaminomethyl, N,N-dimethylaminoethyl, N,N-dimethylaminopropyl, N,N-dimethylaminoamyl, N,N-dimethylaminobutyl, N,N-diethylaminoethyl, N,N-diethylaminopropyl, N,N-diethylaminohexyl, N,N-diethylaminoethoxypropyl, N,N-diethylaminobutyl, N,N-diethylaminopentyl, N,N-dipropylaminobutyl, N,N-dibutylaminopropyl, N,N-dibutylaminoethyl, N,N-dibutylaminobutyl, N,N-diisobutylaminopentyl, N,N-methyl-laurylaminopropyl, N,N-ethyl-hexylaminoethyl, N,N-distearylaminoethyl, N,N-dioleylaminoethyl and N,N-distearylaminobutyl; or N-aminoethyl-4-pipecoline, N-aminoethylmorpholine, N-aminoethylpiperidine, N-aminopropylpiperidine, N-aminopropyl-2-pipecoline, N-aminopropyl-4-pipecoline, N-aminopropylmorpholine, N-aminomethylpiperidine; or N-hydroxymethylpiperidine, N-hydroxyethylpiperidine, N-hydroxypropylpiperidine, N-hydroxyethylpipecoline, N-hydroxypropylpipecoline, N-hydroxymethylpyrrolidine, N-hydroxybutylpyrrolidine, N-hydroxyethylmorpholine, and N-hydroxybutylmorpholine. The amount of the amine component or the alcohol component is not specially limited so long as it is at least equimolar to the amount of the compound of the formula (14) or the formula (15). The amount of the amine component or the alcohol component is preferably 2 mol or more per mol of the compound of the formula (14) or the formula (15).

Examples of the amine component or the alcohol component used for forming the structure of the formula (3) or —O—$(CH_2)_n$—$R_8$ include N-methylpiperazine, N-ethylpiperazine, N-butylpiperazine, 1-amino-4-methylpiperazine, 1-amino-4-cyclopentylpiperazine, 1-cyclopentylpiperazine, N-methyl-3-piperidine methanol, N-methyl-3-hydroxypiperidine, N-ethyl-3-hydroxypiperidine, N-methyl-4-piperidinol and N-methyl-2-hydroxyethylpyrrolidine. The amount of the amine component or the alcohol component is not specially limited so long as it is at least equimolar to the amount of the compound of the formula (14) or the formula (15). The amount of the amine component or the alcohol component is preferably 2 mol or more per mol of the compound of the formula (14) or the formula (15).

When the compound of the formula (7) is synthesized by the above method, it is possible to synthesize the compound of the formula (1) by reacting the compound of the formula (7) with a phthalic anhydride in accordance with the synthesis method of the quinophthalone compound which is used for forming the quinophthalone residue of the formula (4).

Specific examples of the pigment dispersing agent of the formula (1) are shown below, while the present invention shall not be limited to these examples.

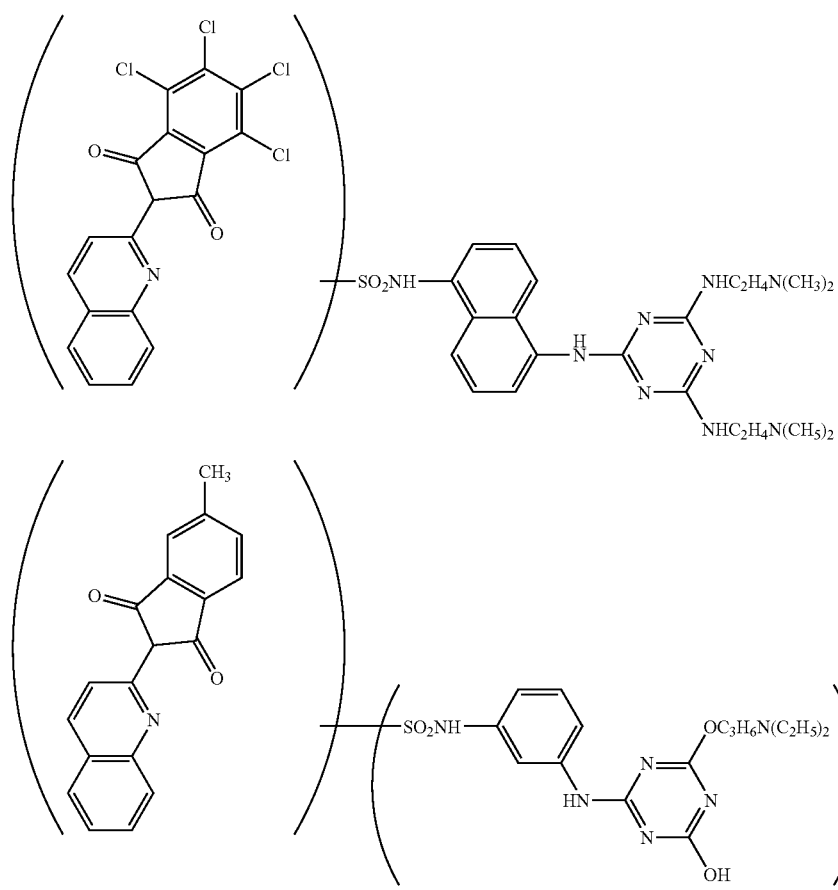

-continued
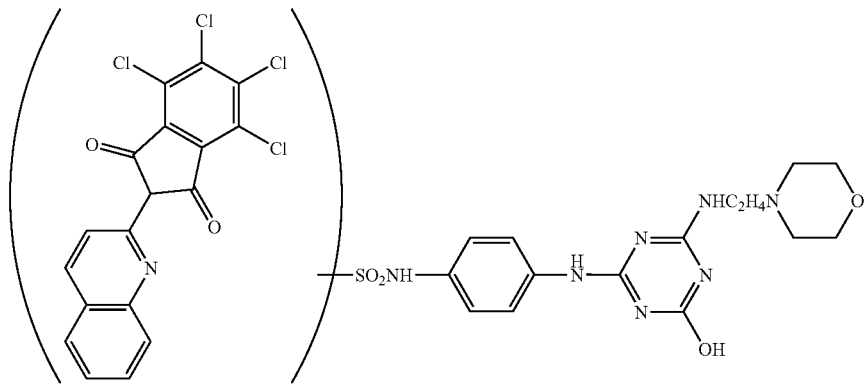
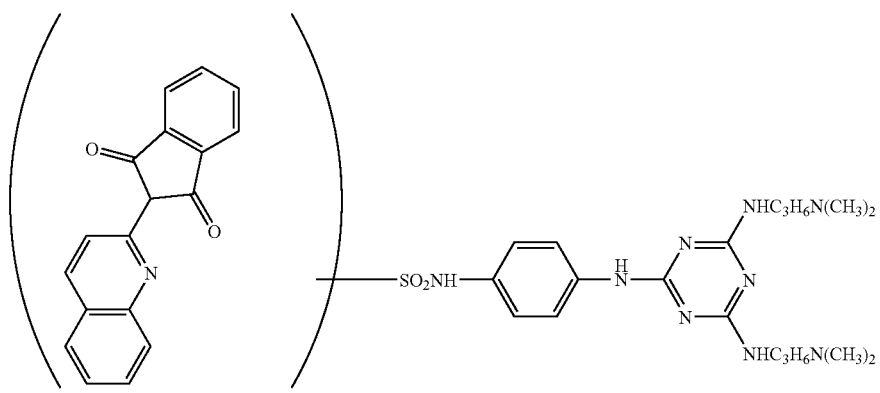
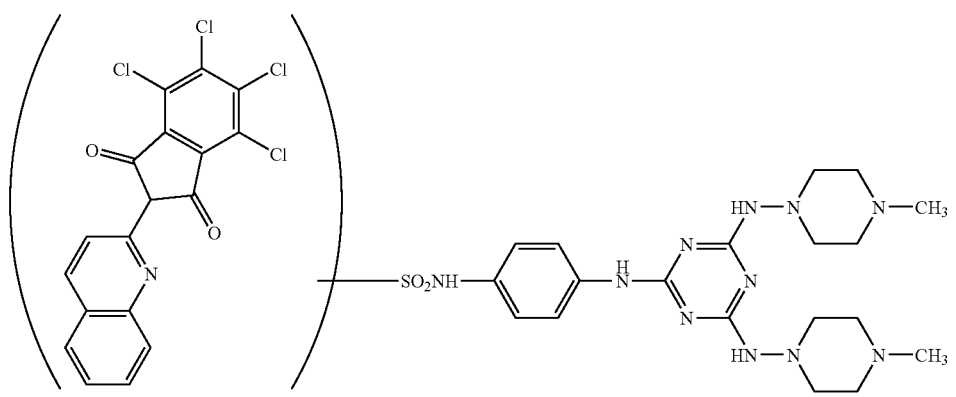
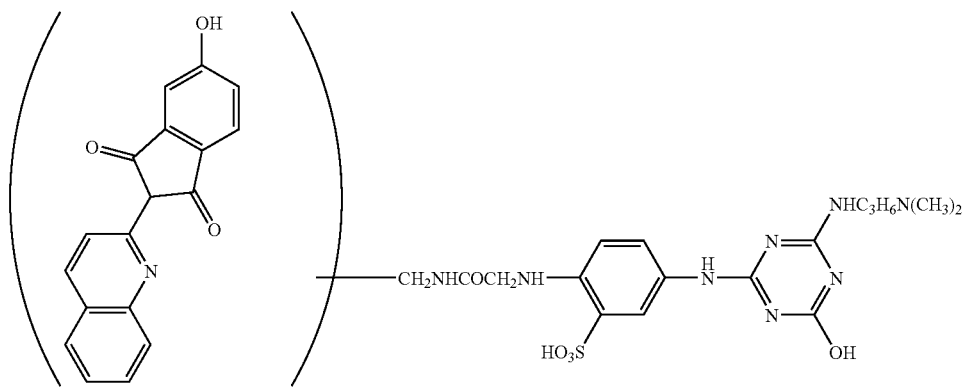

-continued
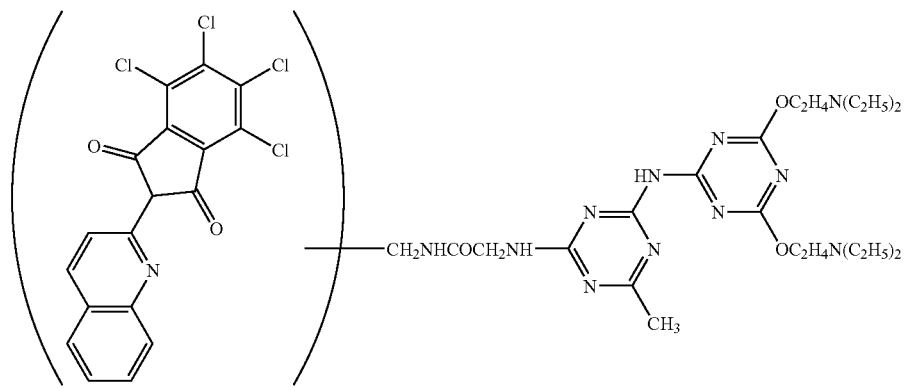
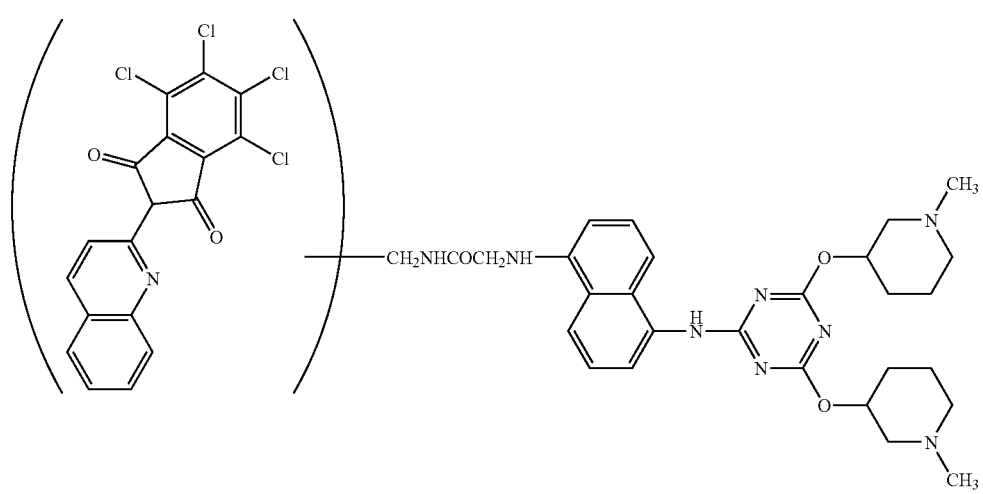
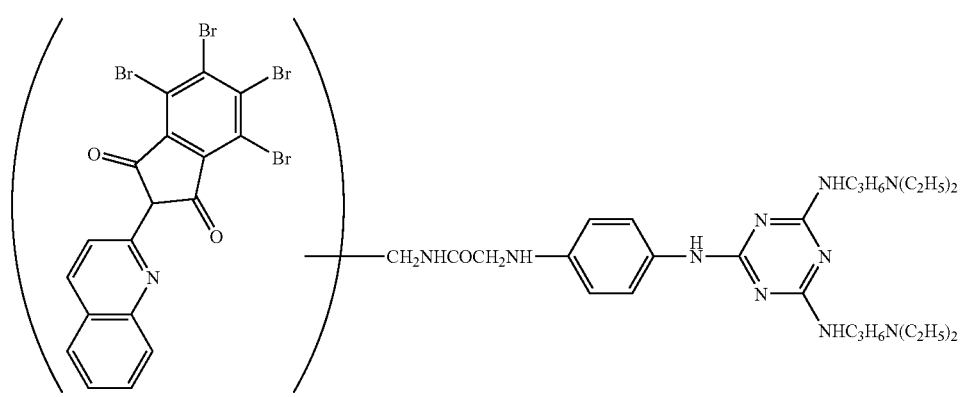
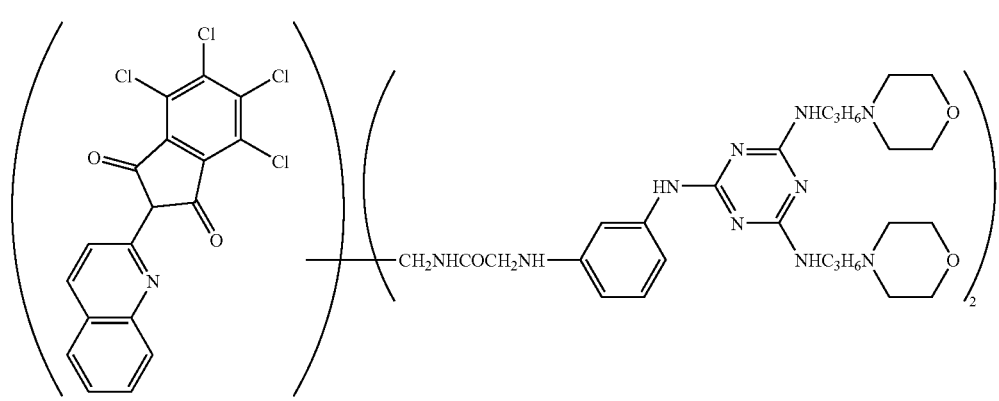

-continued
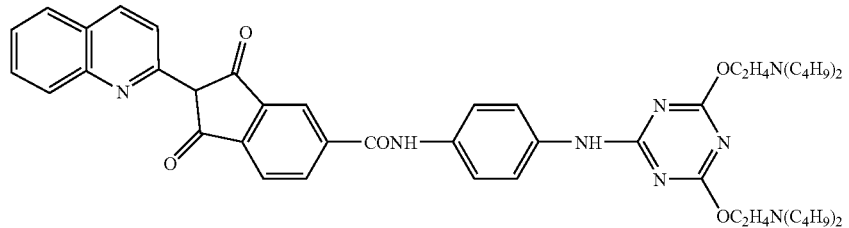
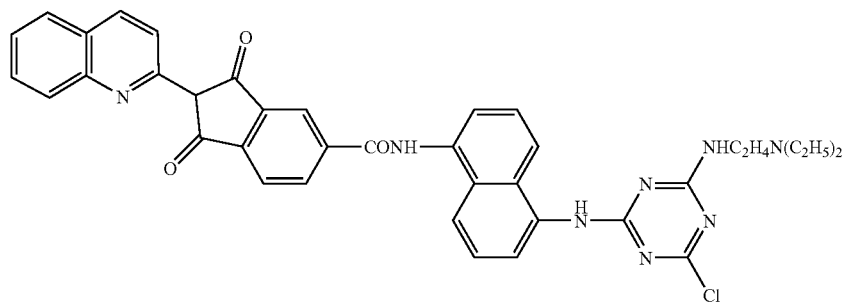
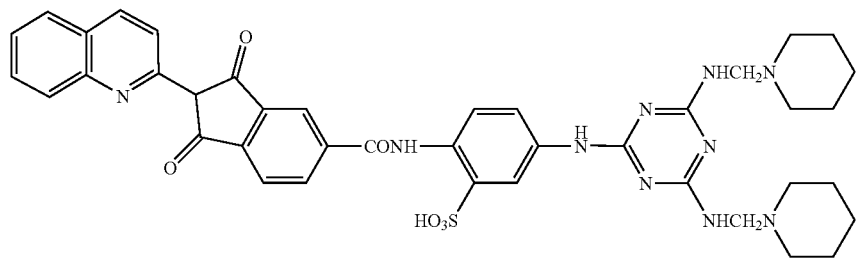
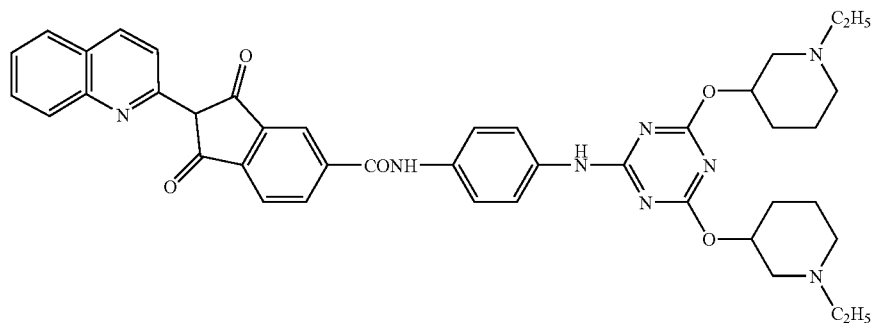
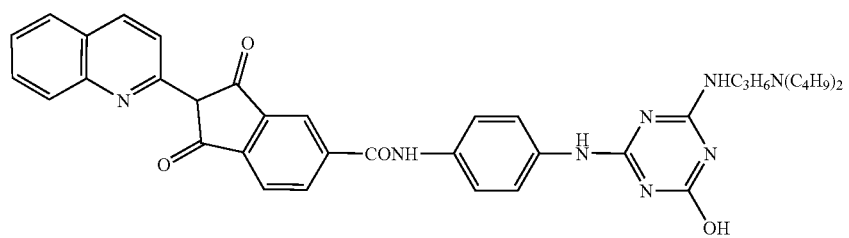

-continued
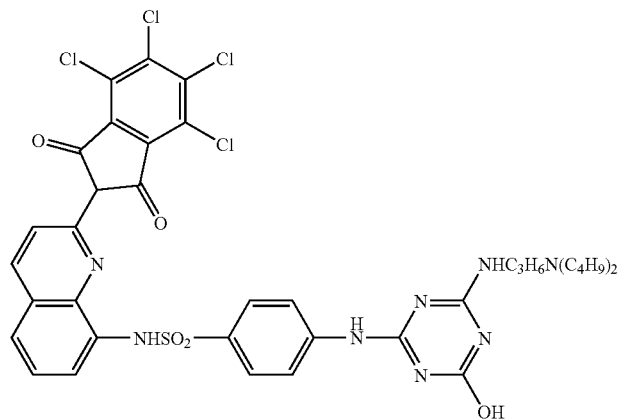
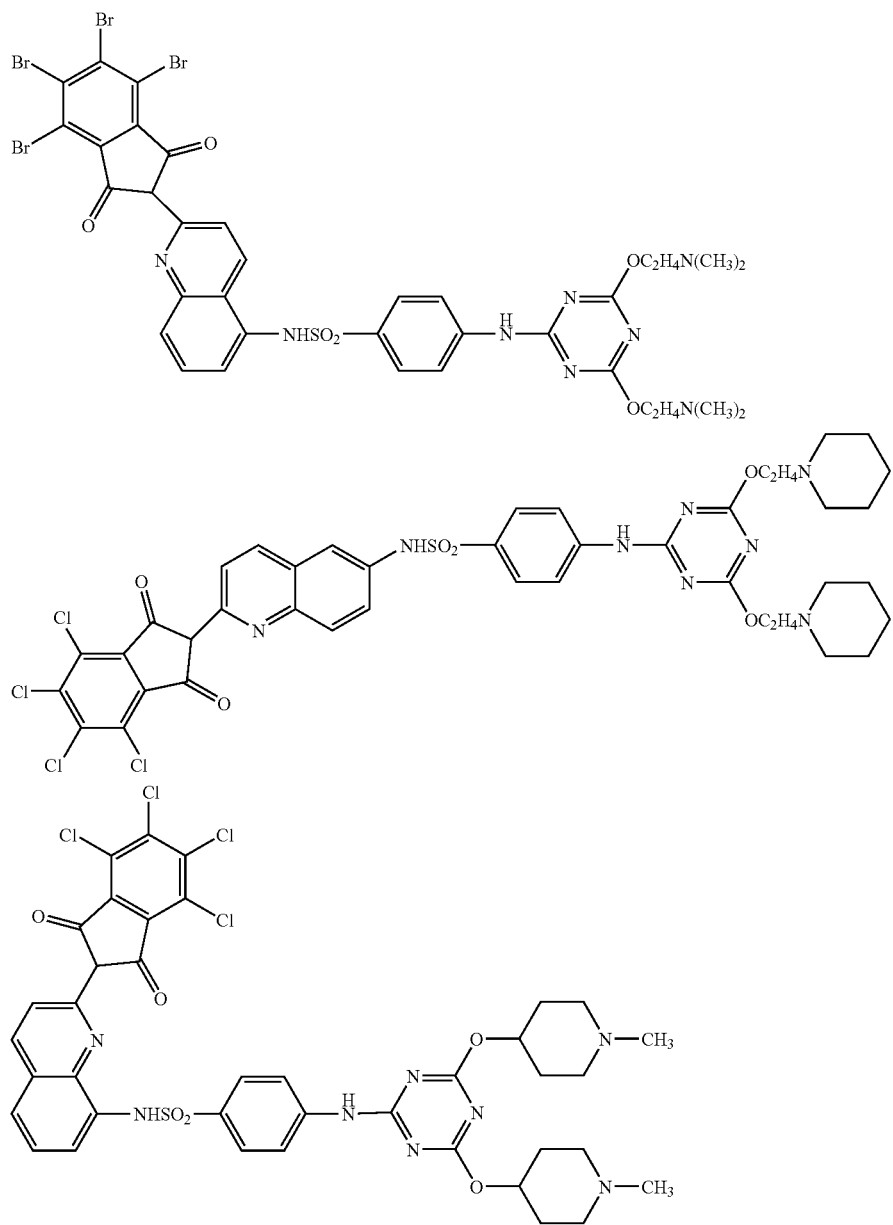

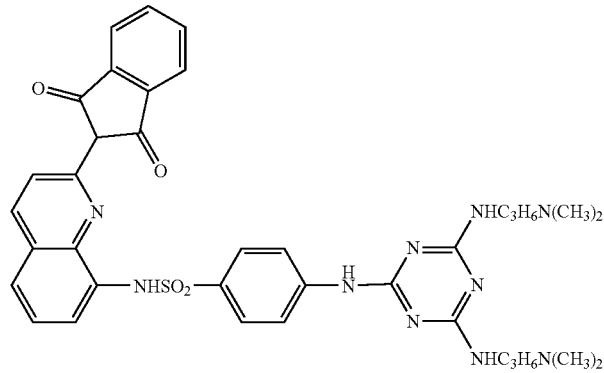

The pigment composition or the pigment dispersion of the present invention contains a pigment and the pigment dispersing agent represented by the formula (1). The pigment can be selected from commercially-available organic pigments such as azo pigments, anthanthrone pigments, anthrapyrimidine pigments, anthraquinone pigments, isoindolinone pigments, isoindolin pigments, indanthrone coloring matters, quinacridone pigments, quinophthalone pigments, dioxazine pigments, diketopyrrolopyrrole pigments, thioindigo coloring matters, pyranthrone coloring matters, phthalocyanine pigments, flavanthrone coloring matters, perinone coloring matters, perylene coloring matters and benzimidazolone pigments, and commercially-available inorganic pigments such as carbon black, titanium oxide, chrome yellow, cadmium yellow, cadmium red, red iron oxide, black iron oxide, zinc oxide, iron blue and ultramarine blue. These pigments may be used in combination. Of these pigments, it is preferred to use an organic pigment.

It is preferred that the pigment composition or pigment dispersion of the present invention contains a yellow pigment. The yellow pigment to be used is not specially limited. Examples thereof include C.I. Pigment Yellows, 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 139, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 198, 213 and 214. Of these, the yellow pigment is preferably one selected from C.I. Pigment Yellow 138, C.I. Pigment Yellow 139, C.I. Pigment Yellow 150, C.I. Pigment Yellow 185 and C.I. Pigment Yellow 13. C.I. Pigment Yellow 138 is particularly preferred. These yellow pigments may be used alone or in combination.

It is preferred that the pigment composition or pigment dispersion of the present invention contains a green pigment. The green pigment to be used is not specially limited. Examples thereof include C.I. Pigment Greens 7, 10, 36 and 37. Of these, the green pigment is preferably one selected from C.I. Pigment Green 7 and C.I. Pigment Green 36. These green pigments may be used alone or in combination. Further, the green pigment and the above yellow pigment may be used in combination for adjusting the hue of the pigment composition or pigment dispersion.

It is preferred that the pigment composition or pigment dispersion of the present invention contains a red pigment or an orange pigment. The red pigment or orange pigment to be used is not specially limited. Examples thereof include C.I. Pigment Reds 7, 14, 41, 48:1, 48:2, 48:3, 48:4, 81:1, 81:2, 81:3, 146, 177, 178, 184, 185, 187, 200, 202, 207, 208, 210, 246, 254, 255, 264, 270 and 272 and C.I. Pigment Oranges 71 and 73. Of these, the red pigment or orange pigment is preferably one selected from C.I. Pigment Reds 254, 255, 264, 177, 207 and 48:1 and C.I. Pigment Oranges 71 and 73. These red and orange pigments may be used alone or in combination. Further, the red or orange pigment and the above yellow pigment may be used in combination for adjusting the hue of the pigment composition or pigment dispersion.

The above commercially available pigments may be directly used as the pigment used in the pigment composition or pigment dispersion of the present invention, while these pigments may be size-reduced to a desired particle diameter by solvent salt milling, dry milling or other methods before use, as required.

For example, in the case of size-reduction of an organic pigment by the solvent salt milling, a mixture comprising at least three components of the organic pigment, a water-soluble inorganic salt and a water-soluble solvent is converted into a clay-like mixture, and the mixture is strongly kneaded with a kneader or the like. The kneaded mixture is poured to water and then stirred with a stirrer to obtain a slurry, and it is filtered to remove the water-soluble inorganic salt and the water-soluble solvent. The above slurrying, filtration and washing with water are repeated, to obtain a size-reduced fine organic pigment.

The water-soluble inorganic salt is typically sodium chloride or potassium chloride. The inorganic salt is used in an amount at least equal to, preferably twenty times or less larger than, the weight of the organic pigment. When the amount of the inorganic salt is less than the weight of the organic pigment, it is difficult to sufficiently size-reduce the pigment. On the other hand, when the amount of the inorganic salt is more than twenty times the weight of the organic pigment, considerable effort is required for removing the water-soluble inorganic salt and the water-soluble solvent after the kneading and in addition, undesirably in terms of productivity, the amount of the pigment which can be treated in one time is decreased.

In the above size-reduction method, heat generates due to the kneading in many cases. Therefore, it is preferred to use a water-soluble solvent having a boiling point of about 120 to 250° C. in view of safety. Examples thereof include 2-(methoxymethoxy) ethanol, 2-butoxyethanol, 2-(isopentyloxy)ethanol, 2-(hexyloxy)ethanol, ethylene glycol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether and low-molecular-weight polypropylene glycol.

In the above size-reduction method, it is possible to use one pigment or at least two pigments in combination. Further, the pigment dispersing agent of the formula (1) and the pigment may be mixed and used. In this case, finer particles can be obtained in comparison with a case where size-reduction with the pigment alone is carried out, and at the same time the pigment dispersing agent is homogeneously treated in the pigment, so that it is preferred for preparing a higher-quality pigment composition or pigment dispersion.

The amount of the pigment dispersing agent of the formula (1) in the pigment composition or the pigment dispersion of the present invention is preferably 0.5 to 30 parts by weight per 100 parts by weight of the pigment. When the amount of the pigment dispersing agent of the formula (1) is less than 0.5 part by weight, undesirably, the effect of dispersing the pigment is small. When it is larger than 30 parts by weight, the dispersing effect corresponding to the amount is not obtained and, in addition, a decrease in viscosity and coating film properties occurs in some cases.

With regard to the method of preparing the pigment composition of the present invention, a sufficient dispersing effect can be obtained by merely mixing a pigment powder and a powder of the pigment dispersing agent of the formula (1). A higher dispersing effect can be obtained by a method in which mixing is mechanically carried out using a dissolver, a high-speed mixer, a homomixer, a kneader, a roll mill, an attritor, a sand mill, a pulverizer, etc., a method in which a solution of the pigment dispersing agent of the formula (1) is added to a suspension of the pigment in water or an organic solvent and the pigment dispersing agent is deposited on the surface of the pigment, or a method in which organic pigment and the pigment dispersing agent are dissolved in a solvent having a strong dissolving power such as sulfuric acid and then the resultant solution is poured to a poor solvent such as water to carry out coprecipitation.

The pigment dispersion of the present invention is prepared by dispersing a mixture of the pigment, the pigment dispersing agent, an organic solvent and a resin (varnish) with a dispersing machine. In addition to the above raw materials, an additive, a resin type dispersing agent, etc., may be added before dispersing, as required. In the preparation of the pigment dispersion, the pigment and the pigment dispersing agent may be added in the form of a pigment composition obtained by mixing them. Otherwise, it is possible to add the pigment and the pigment dispersing agent separately and then disperse the mixture. Further, the addition order of the raw materials or the addition methods thereof are not specially limited.

Examples of the resin used for preparing the pigment dispersion of the present invention include a petroleum resin, casein, shellac, a rosin-modified maleic resin, a rosin-modified phenol resin, nitrocellulose, cellulose acetate butyrate, cyclized rubber, chlorinated rubber, oxidized rubber, hydrochlorinated rubber, a phenol resin, an alkyd resin, a polyester resin, an unsaturated polyester resin, an amino resin, an epoxy resin, a vinyl resin, vinyl chloride, a vinyl chloride-vinyl acetate copolymer, an acrylic resin, a methacrylic resin, a polyurethane resin, a silicon resin, a fluororesin, a drying oil, a synthesized drying oil, a styrene-modified maleic resin, a polyamide resin, a polyimide resin, a benzoguanamine resin, a melamine resin, urea resin chlorinated polypropylene, a butyral resin and a vinylidene chloride resin.

Further, a photosensitive resin can be used as the resin. As the photosensitive resin, for example, there may be used a resin obtained by introducing a photocrosslinkable group such as a (meth)acryloyl group or a styryl group into a linear polymer having a reactive substituent such as a hydroxyl group, a carboxylic group or an amino group by a reaction between a (meth)acrylic compound having a reactive substituent such as an isocyanate group, an aldehyde group or an epoxy group or a cinnamic acid and the above linear polymer, and a resin obtained by half-esterification of a linear polymer containing an acid anhydride such as a styrene-maleic anhydride copolymer or an α-olefin-maleic anhydride copolymer with a (meth)acrylic compound having a hydroxyl group such as hydroxyalkyl (meth)acrylate.

The solvent used for preparing the pigment dispersion of the present invention is not specially limited and can be selected from all solvents which are generally used as an organic solvent. Examples of the solvent include cyclohexanone, ethylcellosolve acetate, butylcellosolve acetate, propylene glycol monomethylether acetate, diethylene glycol dimethyl ether, ethylbenzene, ethylene glycol diethyl ether, toluene, xylene, ethylcellosolve, methyl-n-amylketone, propylene glycol monomethylether, toluene, methyl ethyl ketone, methyl isobutyl ketone, ethyl acetate, butyl acetate, n-hexane, methanol, ethanol, isopropyl alcohol, butanol, dioxane, dimethylformamide, Solvesso 100 (supplied by Exxon Chemical Japan Ltd), Suwasol 1000 and a petroleum type solvent. These solvents may be used alone or in combination.

A dispersing machine used for preparing the pigment dispersion of the present invention is not specially limited. Examples thereof include a horizontal sand mill, a vertical sand mill, an annular type bead mill, an attritor, a microfluidizer, a high-speed mixer, a homomixer, a ball mill, a roll mill, a stone mill, an ultrasonic dispersing machine and a paint conditioner. There can be used a variety of dispersing machines and mixers which are generally used for preparing a variety of dispersions.

Further, a treatment such as pre-dispersing using a kneading and mixing machine such as kneader or a three-roll mill or solid dispersing using a two-roll mill may be carried out before the dispersing with a dispersing machine. Further, it is effective for imparting dispersion stability to the pigment dispersion to carry out a step of a post treatment after the dispersing with a dispersing machine, such as a post treatment of preserving the pigment dispersion, which has been dispersed with the dispersing machine, under a heating state of 30 to 80° C. for about several hours to 1 week or a post treatment using a ultrasonic dispersing machine or a collision type bead-less dispersing machine.

EXAMPLES

The present invention will be explained more in detail with reference to Examples hereinafter, while the present invention shall not be limited to these Examples.

Production Example 1<Synthesis of Quinophthalone Derivative A>

540 g of benzoic acid was charged in a stirring vessel, and then heated to 130° C. to melt it. 34 g of quinaldine and 204 g of tetrachlorophthalic anhydride were added to the molten benzoic acid. The reaction vessel was heated to 160° C. and the mixture was stirred for 10 hours. Then, the temperature was decreased to 130° C., and 950 g of 25%-sodium hydroxide aqueous solution was added. A suspension generated was poured to 10 liters of water, and it was heated to 80° C. and stirred for 1 hour. The suspension was suction filtered, and washing with water was carried out until the filtrate became neutral. Then, drying was carried out to obtain 89 g (91%) of Quinophthalone derivative A represented by the formula (16).

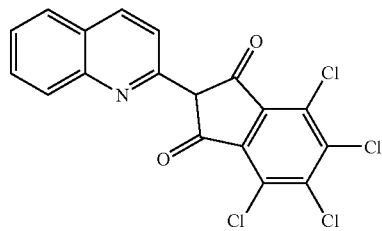

(16)

Production Example 2<Synthesis of Quinophthalone Derivative B>

65 g (86%) of Quinophthalone derivative B represented by the formula (17) was obtained in the same manner as in Production Example 1 except that 204 g of tetrachlorophthalic anhydride was replaced with 139 g of trimellitic anhydride and the heating time at 160° C. was changed to 24 hours.

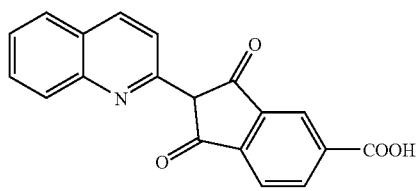

(17)

Production Example 3<Synthesis of Pigment Dispersing Agent A>

100 g of Quinophthalone derivative A represented by the formula (16) was step by step added to 1,000 g of a chlorosulfonic acid at 10 to 20° C. with stirring. After the completion of the addition, the mixture was stirred at 40 to 50° C. for 1 hour. Then, 180 g of thionyl chloride was added, and the resultant mixture was stirred at the above temperature for 3 hours. The reaction mixture was cooled to room temperature, and then it was step by step poured to 10 liters of ice water with keeping a temperature of 10° C. or less, to generate a precipitate. The precipitate was filtered and washed with ice water, to obtain a chlorosulfonated product (water-containing cake) of Quinophthalone derivative A. The chlorosulfonated product was slurried in 3 liters of ice water, 32 g of 1,3-phenylenediamine was added, and the mixture was stirred at 5° C. for 3 hours and then 50° C. for 1 hour. After the completion of the stirring, filtration, washing with water and drying were carried out to obtain 102 g (70%) of Intermediate A represented by the formula (18).

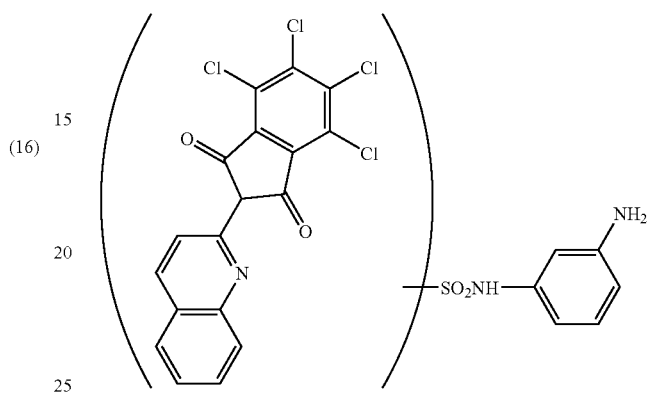

(18)

400 g of acetone was cooled to 5° C. and 44 g of cyanuric chloride was added. Then, 96 g of the Intermediate A represented by the formula (18) was step by step added with keeping a temperature of 5° C. Then, 90 g of 10%-sodium carbonate aqueous solution was added and the resultant mixture was stirred at 5° C. for 3 hours, to generate a precipitate. The precipitate was filtered and washed with water, and then it was again slurried in 400 g of acetone. The slurry was filtered and washed with acetone, to obtain Intermediate B (acetone-containing cake) represented by the formula (19).

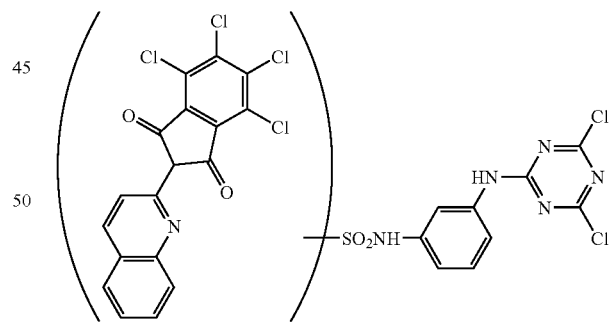

(19)

The thus-obtained Intermediate B (acetone-containing cake) represented by the formula (19) was step by step added to a mixed solution of 320 g of 1,4-dioxane and 103 g of N-aminoethylpiperidine at a temperature of 60° C. or less. Then, the mixture was stirred at 90° C. for 5 hours. The reaction mixture was cooled to room temperature and then poured to 5 liters of water, to generate a precipitate. The precipitate was filtered, washed with water and dried to obtain 116 g ((78%) of Pigment dispersing agent A represented by the formula (20).

(20)

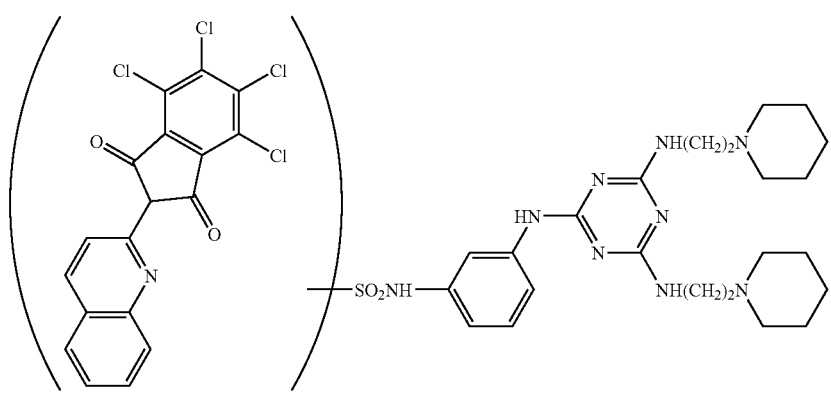

Production Example 4<Synthesis of Pigment Dispersing Agent B>

100 g of Quinophthalone derivative A represented by the formula (16) was added to 1,000 g of 98% sulfuric acid, and the mixture was stirred to dissolve the Quinophthalone derivative A. Then, 93 g of α-chloroacetamide and 39 g paraformaldehyde were added at 30° C. or less, and the mixture was stirred at 25° C. for 2 hours. Then, the stirred mixture was heated to 60° C. and stirred for 4 hours. Then, the mixture was cooled to room temperature and then poured to 10 liters of ice water, to generate a precipitate. The precipitate was filtered and washed with ice water to obtain Intermediate C (water-containing cake) represented by the formula (21).

(21)

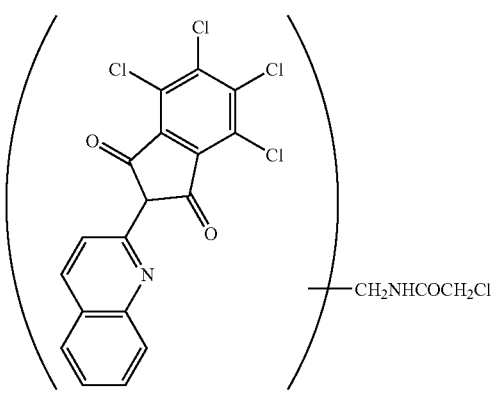

The Intermediate C (water-containing cake) represented by the formula (21) was slurried in 3 liters of acetone. 32 g of 1,4-phenylenediamine was added and the mixture was stirred at 10° C. for 2 hours and then 50° C. for 2 hours. After the completion of the stirring, filtration, washing with acetone and drying were carried out to obtain 110 g (75%) of Intermediate D represented by the formula (22).

(22)

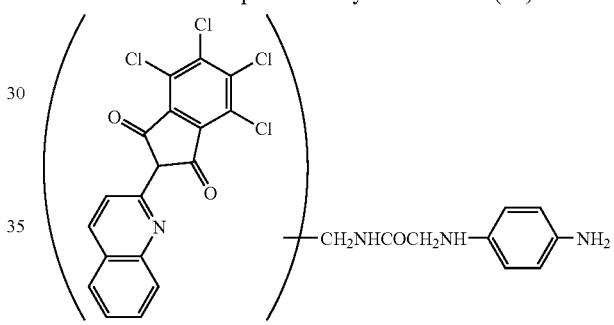

400 g of acetone was cooled to 5° C. and 44 g of cyanuric chloride was added. Then, 97 g of the Intermediate D represented by the formula (22) was step by step added at a temperature of 15° C. or less. Then, 16.3 g of triethylamine was added and the mixture was stirred at 15° C. for 3 hours, to generate a precipitate. The precipitate was filtered and washed with water, and then it was again slurried in 400 g of acetone. The thus-obtained slurry was filtered and washed with acetone to obtain Intermediate E (acetone-containing cake) represented by the formula (23).

(23)

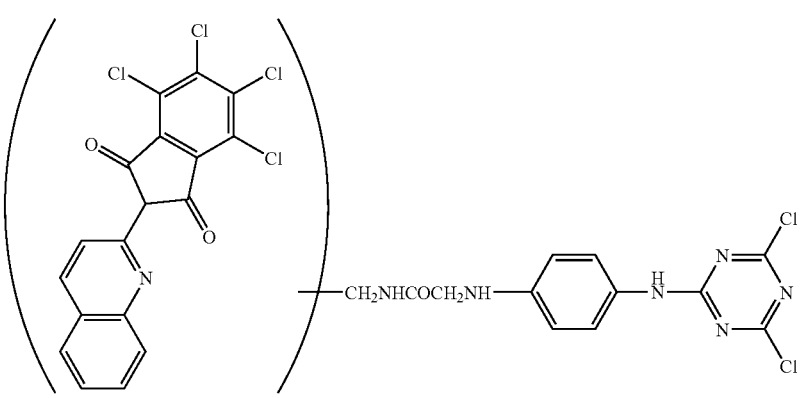

The thus-obtained Intermediate E (acetone-containing cake) represented by the formula (23) was step by step added to a mixed solution of 320 g of 1,4-dioxane and 81 g of N-methylpiperazine at a temperature of 60° C. or less. Then, the mixture was stirred at 90° C. for 7 hours. The reaction mixture was cooled to room temperature and then poured to 5 liters of water, to generate a precipitate. The precipitate was filtered, washed with water and dried to obtain 118 g (84%) of Pigment dispersing agent B represented by the formula (24).

400 g of acetone was cooled to 5° C. or less and 44 g of cyanuric chloride was added. Then, 73 g of the Intermediate F represented by the formula (25) was step by step added at a temperature of 15° C. or less. Then, 16.3 g of triethylamine was added and the mixture was stirred at 10° C. for 3 hours, to generate a precipitate. The precipitate was filtered and washed with water, and then it was again slurried in 400 g of acetone. The thus-obtained slurry was filtered and washed with acetone to obtain Intermediate G (acetone-containing cake) represented by the formula (26).

(24)

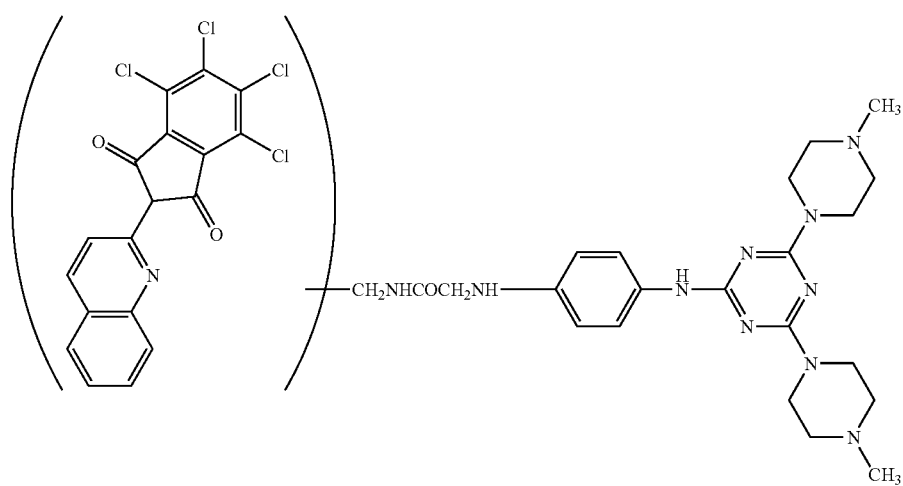

Production Example 5<Synthesis of Pigment Dispersing Agent C>

100 g of Quinophthalone derivative B represented by the formula (17) was added to 500 g of a chlorosulfonic acid and the mixture was stirred at 20° C. for 3 hours. Then, 42 g of thionyl chloride was added and the mixture was stirred at 50° C. for 2 hours. The reaction mixture was cooled to room temperature and then poured to 5 liters of ice water, and the mixture was filtered and washed with water to obtain carboxylic acid chloride (water-containing cake) of the Quinophthalone derivative B. The carboxylic acid chloride was slurried in 1,500 g of acetone. 93 g of 1,5-diaminonaphthalene was added, and the mixture was stirred at 40° C. for 4 hours. Then, 42 g of sodium carbonate was added. The mixture was stirred at 80° C. for 1 hour and then it was filtered, washed with water and dried, to obtain 111 g (77%) of Intermediate F represented by the formula (25).

(26)

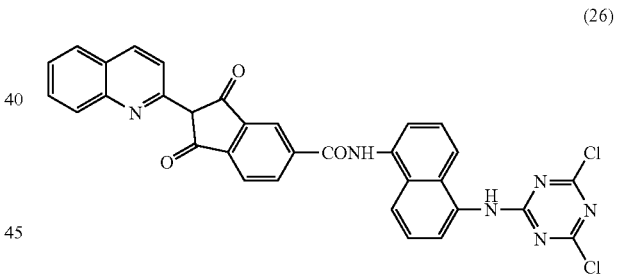

(25)

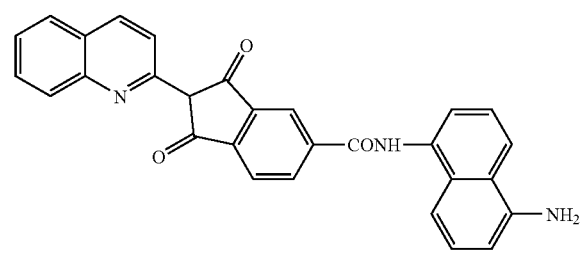

The thus-obtained Intermediate G (acetone-containing cake) represented by the formula (26) was step by step added to a mixed solution of 320 g of 1,4-dioxane and 125 g of N-aminopropyl-2-pipecoline at a temperature of 60° C. or less. Then, the mixture was stirred at 95° C. for 5 hours. The reaction mixture was cooled to room temperature and then poured to 5 liters of water, to generate a precipitate. The precipitate was filtered, washed with water and dried to obtain 111 g (82%) of Pigment dispersing agent C represented by the formula (27).

(27)

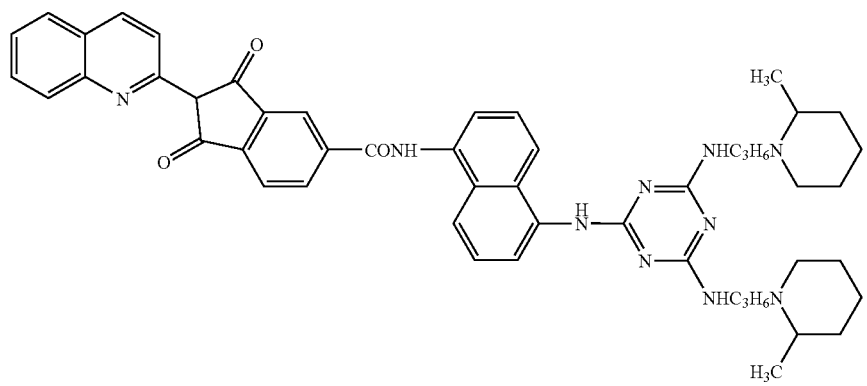

Production Example 6<Synthesis of Pigment Dispersing Agent D>

84 g of 8-aminoquinaldine was dissolved in 1,100 g of methanol by means of stirring, and then 57 g of sodium carbonate and 112 g of 4-acetamidobenzenesulfonyl chloride were added. The mixture was stirred at 25 to 35° C. for 4 hours. After the stirring, 600 g of water and 152 g of 35% hydrochloric acid were added, and the mixture was heated to a reflux temperature. Methanol was distilled off until the reflux temperature reached to 100° C. After the distillation, 400 g of water was added and the mixture was cooled to 60° C. or less. Then, its pH was adjusted to 12.0 with 25%-sodium hydroxide aqueous solution. The mixture was stirred at 50° C. for 1 hour. The mixture was allowed to stand until its temperature decreased to room temperature. Then, its pH was adjusted to 4.0 with an acetic acid. The mixture was stirred for at room temperature for 1 hour. Filtration, washing with water and drying were carried out to obtain 116 g (77%) of Intermediate H represented by the formula (28).

(28)

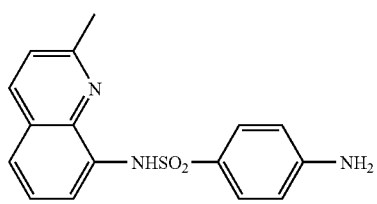

400 g of acetone was cooled to 5° C., and 45 g of cyanuric chloride was dissolved in the acetone. Then, a solution of 50 g of the Intermediate H represented by the formula (28) in 120 g of N-methyl-2-pyrrolidone was dropwise added with keeping a temperature of 5° C. Then, 85 g of 10%-sodium carbonate aqueous solution was similarly dropwise added with keeping a temperature of 5° C. A product obtained was filtered and washed with water, to obtain an aqueous cake. The aqueous cake was again slurried in 400 g of acetone. The slurry was filtered and washed with acetone, to obtain Intermediate I (acetone-containing cake) represented by the formula (29).

(29)

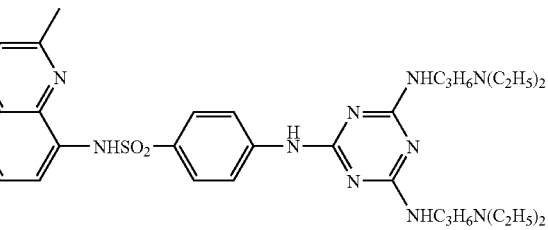

The thus-obtained Intermediate I (acetone-containing cake) represented by the formula (29) was step by step added to a mixed solution of 320 g of 1,4-dioxane and 105 g of diethylaminopropyl amine at a temperature of 60° C. or less. Then, the mixture was stirred at 50 to 60° C. for 1.5 hours and at 90° C. for 3.5 hours. 200 g of water was added to the reaction mixture. The mixture was heated to a reflux temperature and 1,4-dioxane was distilled off. The resultant mixture was cooled to room temperature. Its pH was adjusted to 4.0 with an acetic acid and a product was dissolved. The reaction mixture was poured to 1 liter of water and the pH was adjusted to 11 with sodium hydroxide. A supernatant liquid was removed by decantation. Washing was carried out until it became neutral. Then, drying was carried out under vacuum at 50° C. to obtain 96 g (92%) of Intermidiate J represented by the formula (30).

(30)

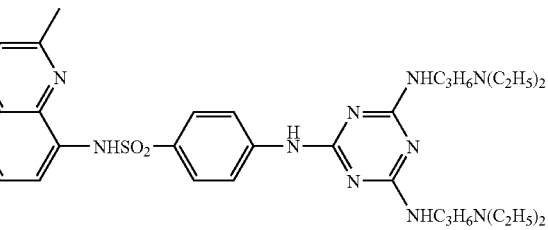

270 g of benzoic acid was molten at 160° C., and 78 g of the Intermediate J represented by the formula (30) was dissolved in the benzoic acid. Then, 103 g of tetrachlorophthalic anhydride was added and the mixture was stirred at 160° C. for 4 hours. After the stirring, 1,000 g of methanol was step by step added to the mixture. The reaction mixture was poured to 7,500 g of water, and the pH was adjusted to 11 with a sodium hydroxide aqueous solution. Then, the mixture was stirred at 80° C. for 1 hour, to generate a precipitate. The precipitate was filtered, washed with water and dried to obtain 98 g (89%) of Pigment dispersing agent D represented by the formula (31).

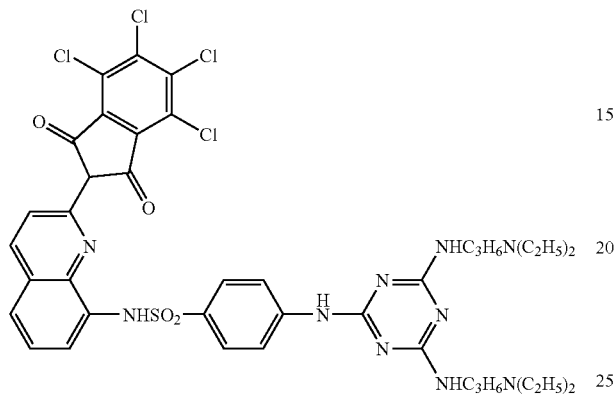

(31)

Production Example 7<Synthesis of Pigment Dispersing Agent E>

79.1 g of 8-aminoquinaldine and 60.7 g of triethylamine were homogeneously dissolved in 500 g of acetone. Then, a solution of 111 g of 4-nitrobenzoyl chloride in 340 g of acetone was dropwise added. After the completion of the addition, the mixture was stirred at 25° C. to 35° C. for 1 hour and then stirred at a reflux temperature for 3 hours. After the stirring, 2,000 g of water and 125 g of 25%-sodium hydroxide aqueous solution were added and the resultant mixture was stirred at a reflux temperature for 1 hour. The reaction mixture was poured to a beaker containing 6,700 g of water, and the resultant mixture was stirred at room temperature for 1 hour. A product obtained was filtered, washed with water and dried to obtain 150 g (98%) of Intermediate K represented by the formula (32).

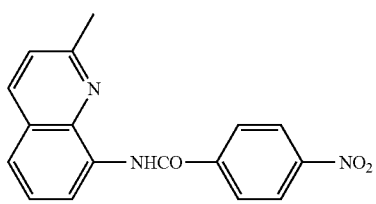

(32)

680 g of a benzoic acid was added to a stirring vessel, and then heated to 160° C. to melt it. 93.3 g of the Intermediate K represented by the formula (32) and 260 g of tetrachlorophthalic anhydride were added to the molten benzoic acid. The mixture was stirred at 160° C. for 10 hours. Then, the mixture was cooled to 130° C., and 750 g of methanol was step by step added. The reaction mixture was poured to a solution of 470 g of sodium hydroxide in 17,000 g of water. A suspension generated was heated to 80° C. and stirred for 1 hour. Then, it was suction filtered and washing with water was carried out until the filtrate became neutral. Then, drying was carried out to obtain 104 g (60%) of Intermediate L represented by the formula (33).

(33)

47.0 g of the Intermediate L represented by the formula (33) was mixed with 1,000 g of water to obtain a slurry. 196 g of sodium sulfide 9-hydrate was added to the slurry. The mixture was stirred at 70° C. for 24 hours, and then it was filtered to separate a product. The product separated by filtering was added to 3,000 ml of 1N-hydrochloric acid and slurried. The slurried mixture was stirred at room temperature for 1 hour, and then filtration and washing with water were carried out. Then, the resultant mixture was added to 2,000 ml of 1N-sodium hydroxide aqueous solution to obtain a slurry, and the slurry was stirred at room temperature for 1 hour, then filtered and washed with water. Slurrying with water, filtration and washing with water were repeated until filtrate became neutral. Then, drying was carried out to obtain 40 g (90%) of Intermediate M represented by the formula (34).

(34)

400 g of acetone was cooled to 5° C., and 44 g of cyanuric chloride was added to the acetone. Then, 87 g of the Intermediate M represented by the formula (34) was step by step added with keeping a temperature of 5° C. Then, 90 g of 10%-sodium carbonate aqueous solution was added, and the mixture was stirred at 5° C. for 3 hours. A product obtained was filtered and washed with water. Then, it was again slurried in 400 g of acetone. The slurry was filtered and washed with acetone, to obtain Intermediate N (acetone-containing cake) represented by the formula (35).

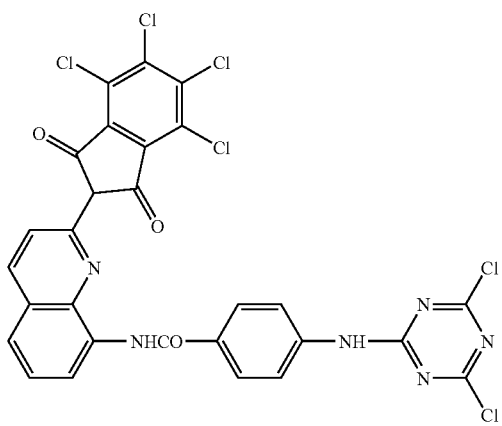

(35)

The thus-obtained Intermediate N (acetone-containing cake) represented by the formula (35) was step by step added to a mixed solution of 320 g of 1,4-dioxane and 105 g of diethylaminopropylamine at a temperature of 60° C. or less. Then, the mixture was stirred at 50 to 60° C. for 2 hour and at 90° C. for 4 hours. The reaction mixture was cooled to room temperature and then poured to 5 liters of water, to generate a precipitate. The precipitate was filtered, washed with water and dried to obtain 105 g (75%) of Pigment dispersing agent E represented by the formula (36).

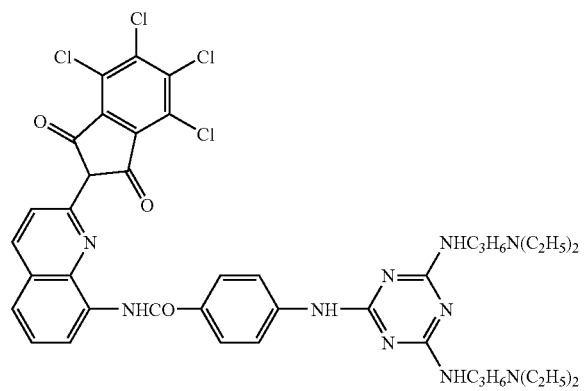

(36)

(Preparation of Acrylic Resin Solution)

A separable four-necked flask equipped with a thermometer, a condenser, a nitrogen-gas-introducing tube and a stirrer was charged with 700 g of cyclohexanone and it was heated to 80° C. The atmosphere in the reactor was replaced with nitrogen. Then, a mixture of 133 g of n-butylmethacrylate, 46 g of 2-hydroxyethylmethacrylate, 43 g of methacrylic acid, 74 g of paracumylphenol ethyleneoxide-modified acrylate ("ARONIX M110", supplied by Toagosei co., Ltd.) and 4.0 g of 2,2'-azobisisobutyronitrile was dropwise added from a dropping tube over 2 hours. After the completion of the addition, the reaction was further continued for 3 hours, to obtain a solution of an acrylic resin having a weight average molecular weight of 26,000.

The thus-obtained solution was cooled to room temperature. Then, about 2 g of the resin solution was dried under heat at 180° C. for 20 minutes and a nonvolatile content was measured. Cyclohexanone was added such that the nonvolatile content of the resin solution became 20%, to obtain an acrylic resin solution.

(Preparation of Yellow Treatment Pigment)

A mixture of 300 g of a quinophthalone yellow pigment (C.I. Pigment Yellow 138, "Paliotol Yellow K0960-HD, supplied by BASF), 300 g of sodium chloride and 150 g of diethylene glycol was kneaded with a 1-gallon kneader made of stainless steel (supplied by INOUE MFG., INC.) at 120° C. for 2 hours. Then, the kneaded mixture was poured to 5 liters of hot water and stirred under heat at 70° C. for 1 hour, to obtain a slurried material. Filtration and washing with water were repeated to remove sodium chloride and diethylene glycol. Then, the resultant material was dried at 80° C. for a whole day and night to obtain 290 g of a yellow treatment pigment.

(Preparation of Green Treatment Pigment)

A mixture of 300 g of a phthalocyanine green pigment (C.I. Pigment Green 36, "Lionol Green 6YK" supplied by Toyo Ink Mfg. Co., Ltd.), 300 g of sodium chloride and 150 g of diethylene glycol was kneaded with a 1-gallon kneader made of stainless steel (supplied by INOUE MFG., INC.) at 120° C. for 2 hours. Then, the kneaded mixture was poured to 5 liters of hot water and stirred under heat at 70° C. for 1 hour, to obtain a slurried material. Filtration and washing with water were repeated to remove sodium chloride and diethylene glycol. Then, the resultant material was dried at 80° C. for a whole day and night to obtain 290 g of a green treatment pigment.

Examples 1 to 14 and Comparative Examples 1 to 9

A pigment, one of Pigment dispersing agents A to E obtained in Production Examples 3 to 7 as a pigment dispersing agent, the above-obtained acrylic resin solution and cyclohexane as a solvent in amounts shown in Table 1 were placed in a 140-ml screw cap bottle. 150 g of zirconia beads having a diameter of 1.25 mm were added, and dispersing operation was carried out with a paint conditioner for 15 hours to obtain a pigment dispersion.

(Evaluation of the Dispersions)

Each of the pigment dispersions was measured for a viscosity and a thixotropy index value (TI value) with a B type viscosimeter. Further, the pigment dispersions each were independently applied to PET films so as to have a wet thickness of 12 µm and then dried at 150° C. for 2 minutes, to obtain coating films respectively. The coating films were measured for gloss. Each of the pigment dispersions was stored at 40° C. for 1 week and then measured for a viscosity increasing rate. The results are shown by ⊙ (almost no viscosity-increase), o (within a usable range although a few viscosity-increase was found), Δ (unusable since viscosity-increase was found) and × (unusable since considerable viscosity-increase was found). Table 1 shows these results. As shown in Table 1, each of the pigment dispersions using the pigment dispersing agents of the present invention had a low viscosity and low thixotropic properties and showed excellent fluidity. Further, they were also excellent in viscosity stability with the passage of time.

TABLE 1

| | Pigment (*2) | | Pigment dispersing agent (*1) | | Acrylic resin solution | Solvent | Viscosity | | | Evaluation | Storage stability with the passage of time |
|---|---|---|---|---|---|---|---|---|---|---|---|
| | Kind | Amount (g) | Kind | Amount (g) | Amount (g) | Amount (g) | 6 rpm | 60 rpm | TI value | Gloss 60° G | |
| Ex. 1 | Yellow | 10.8 | A | 1.2 | 25.7 | 42.3 | 40 | 36.2 | 1.10 | 142 | ⊚ |
| Ex. 2 | treatment | 10.8 | B | 1.2 | 25.7 | 42.3 | 72 | 61.8 | 1.17 | 142 | ○ |
| Ex. 3 | pigment | 10.8 | C | 1.2 | 25.7 | 42.3 | 32 | 30.5 | 1.05 | 139 | ⊚ |
| Ex. 4 | | 10.8 | D | 1.2 | 25.7 | 42.3 | 28 | 26.4 | 1.06 | 146 | ⊚ |
| Ex. 5 | | 10.8 | D | 0.5 | 25.7 | 43.0 | 45 | 39.8 | 1.13 | 149 | ○ |
| Ex. 6 | | 10.8 | D | 2.0 | 25.7 | 41.5 | 26 | 24.6 | 1.06 | 135 | ⊚ |
| Ex. 7 | | 10.8 | E | 1.2 | 25.7 | 42.3 | 35 | 37.5 | 1.07 | 138 | ⊚ |
| CEx. 1 | | 10.8 | D | 0.05 | 25.7 | 43.45 | 960 | 316 | 3.04 | 115 | X |
| CEx. 2 | | 10.8 | D | 4.0 | 25.7 | 39.5 | 110 | 88 | 1.25 | 124 | Δ |
| CEx. 3 | | 10.8 | Nil | — | 25.7 | 43.5 | 2,400 | 580 | 4.14 | 118 | X |
| Ex. 8 | C.I. Pigment | 10.8 | A | 0.6 | 25.7 | 42.9 | 96 | 82.3 | 1.17 | 128 | ○ |
| CEx. 4 | Yellow 139 | 10.8 | Nil | — | 25.7 | 43.5 | 1,880 | 630 | 2.98 | 112 | X |
| Ex. 9 | C.I. Pigment | 10.8 | C | 1.8 | 25.7 | 41.7 | 73 | 64.8 | 1.13 | 138 | ○ |
| CEx. 5 | Yellow 150 | 10.8 | Nil | — | 25.7 | 43.5 | 720 | 356 | 2.02 | 125 | Δ |
| Ex. 10 | C.I. Pigment | 10.8 | B | 1.8 | 25.7 | 41.7 | 84 | 72.4 | 1.16 | 130 | ○ |
| CEx. 6 | Yellow 185 | 10.8 | Nil | — | 25.7 | 43.5 | 1,660 | 722 | 2.30 | 118 | X |
| Ex. 11 | C.I. Pigment | 10.8 | D | 1.0 | 25.7 | 42.5 | 52 | 47.2 | 1.10 | 141 | ○ |
| CEx. 7 | Red 254 | 10.8 | Nil | — | 25.7 | 43.5 | 820 | 327 | 2.51 | 110 | X |
| Ex. 12 | Green | 10.8 | D | 1.2 | 25.7 | 42.3 | 43 | 39.8 | 1.08 | 136 | ⊚ |
| Ex. 13 | treatment | 10.8 | E | 1.2 | 25.7 | 42.3 | 45 | 49.5 | 1.10 | 135 | ⊚ |
| CEx. 8 | pigment | 10.8 | Nil | — | 25.7 | 43.5 | 1,010 | 312 | 3.24 | 114 | X |
| Ex. 14 | Carbon | 10.8 | C | 2.4 | 25.7 | 41.1 | 89 | 74.2 | 1.20 | 128 | ○ |
| CEx. 9 | Black | 10.8 | Nil | — | 25.7 | 43.5 | 2,240 | 588 | 3.81 | 113 | X |

Ex: Example,
CEx. Comparative Example
*1: Symbols represent the following pigment dispersing agents respectively.
A: Pigment dispersing agent A represented by the formula (20)
B: Pigment dispersing agent B represented by the formula (24)
C: Pigment dispersing agent C represented by the formula (27)
D: Pigment dispersing agent D represented by the formula (31)
E: Pigment dispersing agent E represented by the formula (36)
*2: Pigments represent the following pigments respectively.
C.I. Pigment Yellow 139: PALIOTOL YELLOW D1819 (supplied by BASF)
C.I. Pigment Yellow 150: Yellow Pigment E4GN (supplied by Bayer)
C.I. Pigment Yellow 185: PALIOTOL YELLOW D1155 (supplied by BASF)
C.I. Pigment Red254: IRGAPHORREDB-CF (supplied by Ciba Specialty Chemicals Co.)
Carbon Black: BLACK PEARLS 800 (supplied by Cabot Japan K.K.)

The invention claimed is:

1. A pigment dispersing agent represented by the formula (1),

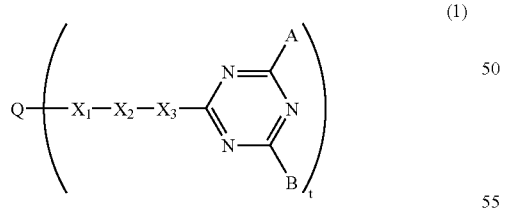

(1)

Q represents a quinophthalone residue or a substituted quinophthalone residue, $X_1$ represents a group selected from the group consisting of —NR'$SO_2$—, —$SO_2$NR'—, —CONR'—, —$CH_2$NR'CO$CH_2$NR'— and —NR'CO—, $X_2$ represents at least one group selected from the group consisting of an arylene group having 20 or less carbon atoms, a substituted arylene group having 20 or less carbon atoms, a heteroaromatic ring having 20 or less carbon atoms, and a substituted heteroaromatic ring having 20 or less carbon atoms, or at least two groups which are selected from the group consisting of an arylene group having 20 or less carbon atoms a substituted arylene group having 20 or less carbon atoms, a heteroaromatic ring having 20 or less carbon atoms, and a substituted heteroaromatic ring having 20 or less carbon atoms and heteroaromatic rings and are bonded to each other with a divalent connecting group selected from the group consisting of —NR'—, —O—, —$SO_2$— and —CO—, $X_3$ represents —NR'— or —O—, where R' represents a hydrogen atom, an alkyl group having 20 or less carbon atoms, a substituted alkyl group having 20 or less carbon atoms, an alkenyl group having 20 or less carbon atoms, a substituted alkenyl group having 20 or less carbon atoms, an aryl group having 20 or less carbon atoms or a substituted aryl group having 20 or less carbon atoms, each of A and B independently represents a group selected from a group represented by the formula (2) or the formula (3), —O—$(CH_2)_n$—$R_8$, —$OR_9$, —$NR_{10}R_{11}$, —Cl, —F or —$X_3$—$X_2$—$X_1$-Q, where $R_8$ represents a nitrogen-containing heterocyclic residue or a substituted nitrogen-containing heterocyclic residue, each of $R_9$, $R_{10}$ and $R_{11}$ independently represents a hydrogen atom, an alkyl group having 20 or less carbon atoms, a substituted alkyl group having 20 or less carbon atoms, an alkenyl group having 20 or less carbon atoms, a substituted alkenyl group having 20 or less carbon atoms, an aryl group having 20 or less carbon atoms or a substituted aryl group having 20 or less carbon atoms, and n is an integer of 0 to 20, provided that at least one of A and B is a group represented by the formula (2) or the formula (3), —O—$(CH_2)_n$—$R_8$, —$OR_9$ or —$NR_{10}R_{11}$, and t is an integer of 1 to 3,

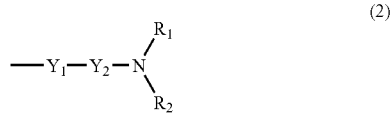

wherein $Y_1$ represents —NR'— or —O—, $Y_2$ represents at least one group selected from the group consisting of an alkylene group having 20 or less carbon atoms, a substituted alkylene group having 20 or less carbon atoms, an alkenylene group having 20 or less carbon atoms, a substituted alkenylene group having 20 or less carbon atoms, an arylene group having 20 or less carbon atoms and a substituted arylene group having 20 or less carbon atoms, or at least two groups which are selected from these alkylene groups, alkenylene groups and arylene groups and are bonded to each other with a divalent connecting group selected from the group consisting of —NR'—, —O—, —$SO_2$— and —CO—, where R' is as defined in the formula (1), and each of $R_1$ and $R_2$ independently represents an alkyl group having 20 or less carbon atoms, a substituted alkyl group having 20 or less carbon atoms, an alkenyl group having 20 or less carbon atoms or a substituted alkenyl group having 20 or less carbon atoms, or $R_1$ and $R_2$ together form a heterocyclic structure which can contain a nitrogen atom, an oxygen atom or a sulfur atom or a substituted heterocyclic structure which can contain a nitrogen atom, an oxygen atom or a sulfur atom,

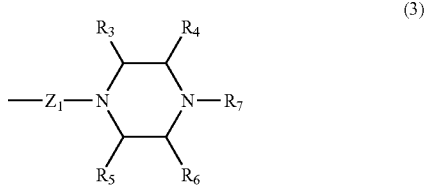

wherein $Z_1$ is a single bond or represents —NR'—, —NR'-G-CO—, —NR'-G-CONR"—, —NR'-G-$SO_2$—, —NR'-G-$SO_2$NR"—, —O-G-CO—, —O-G-CONR'—, —O-G-$SO_2$— or —O-G-$SO_2$NR'—, where G represents an alkylene group having 20 or less carbon atoms, a substituted alkylene group having 20 or less carbon atoms, an alkenylene group having 20 or less carbon atoms, a substituted alkenylene group having 20 or less carbon atoms, an arylene group having 20 or less carbon atoms or a substituted arylene group having 20 or less carbon atoms, and each of R' and R" independently represents a hydrogen atom, an alkyl group having 20 or less carbon atoms, a substituted alkyl group having 20 or less carbon atoms, an alkenyl group having 20 or less carbon atoms, a substituted alkenyl group having 20 or less carbon atoms, an aryl group having 20 or less carbon atoms or a substituted aryl group having 20 or less carbon atoms, each of $R_3$, $R_4$, $R_5$ and $R_6$ independently represents a hydrogen atom, an alkyl group having 20 or less carbon atoms, a substituted alkyl group having 20 or less carbon atoms, an alkenyl group having 20 or less carbon atoms, a substituted alkenyl group having 20 or less carbon atoms, an aryl group having 20 or less carbon atoms or a substituted aryl group having 20 or less carbon atoms, and $R_7$ represents an alkyl group having 20 or less carbon atoms, a substituted alkyl group having 20 or less carbon atoms, an alkenyl group having 20 or less carbon atoms or a substituted alkenyl group having 20 or less carbon atoms.

2. A pigment composition containing a pigment and the pigment dispersing agent recited in claim 1.

3. A pigment composition according to claim 2, wherein the pigment contains a yellow pigment.

4. A pigment composition according to claim 3, wherein the yellow pigment contains at least one pigment selected from the group consisting of C.I. Pigment Yellow 138, C.I. Pigment Yellow 139, C.I. Pigment Yellow 150, C.I. Pigment Yellow 185 and C.I. Pigment Yellow 13.

5. A pigment composition according to claim 2, wherein the pigment contains a green pigment.

6. A pigment composition according to claim 3, wherein the pigment further contains a green pigment.

7. A pigment composition according to claim 5, wherein the green pigment contains C.I. Pigment Green 7 or C.I. Pigment Green 36.

8. A pigment composition according to claim 2, wherein the pigment contains a red pigment or an orange pigment.

9. A pigment composition according to claim 3, wherein the pigment further contains a red pigment or an orange pigment.

10. A pigment composition according to claim 8, wherein the red pigment or the orange pigment contains at least one pigment selected from the group consisting of C.I. Pigment Red 254, C.I. Pigment red 255, C.I. Pigment Red 264, C.I. Pigment Red 177, C.I. Pigment Red 207, C.I. Pigment Red 48:1, C.I. Pigment Orange 71 and C.I. Pigment Orange 73.

11. A pigment dispersion obtained by dispersing the pigment composition recited in claim 2 in a non-aqueous medium.

* * * * *